(12) United States Patent
Suzuki

(10) Patent No.: US 6,818,875 B1
(45) Date of Patent: Nov. 16, 2004

(54) AUTO-FOCUSING APPARATUS

(75) Inventor: Shinichi Suzuki, Saitama (JP)

(73) Assignee: PENTAX Corporation, Tokyo (JP)

( * ) Notice: Subject to any disclaimer, the term of this patent is extended or adjusted under 35 U.S.C. 154(b) by 918 days.

(21) Appl. No.: 09/670,550

(22) Filed: Sep. 27, 2000

(30) Foreign Application Priority Data

Sep. 29, 1999 (JP) ............................................ 11-276575

(51) Int. Cl.⁷ ................................................ G02B 7/04
(52) U.S. Cl. ................................... 250/201.2; 250/201.8
(58) Field of Search ............................ 250/201.2, 201.4, 250/201.5, 201.8, 216, 208.1; 356/3.08, 4.04; 396/79, 80, 94, 111

(56) References Cited

U.S. PATENT DOCUMENTS

| | | | |
|---|---|---|---|
| 5,233,173 A | * | 8/1993 | Moriyama ............... 250/201.8 |
| 5,844,231 A | | 12/1998 | Suzuki et al. |
| 5,856,664 A | | 1/1999 | Suzuki et al. |
| 5,872,661 A | | 2/1999 | Suzuki et al. |

\* cited by examiner

*Primary Examiner*—Que T. Le
(74) *Attorney, Agent, or Firm*—Greenblum & Bernstein, P.L.C.

(57) ABSTRACT

An auto-focusing apparatus includes a light receiving device which separates an image of an object formed via an optical system into two separate images so as to output two sets of image data; a driving device which drives a focusing optical system; an operation device which performs a predetermined operation for determining a phase difference between the two separate images while shifting at least part of one set of image data relative to the other; and a controller which limits a range of shifting of the one set of image data in accordance with an amount of movement of the focusing optical system and a moving direction thereof, when the operation device performs the predetermined operation in accordance with the two sets of image data output from the light receiving device while the driving device drives the focusing optical system along the optical axis.

17 Claims, 16 Drawing Sheets

Phase Difference Detection Range of
B-sensor Data Used in Correlation Operation

AUTO-FOCUSING APPARATUS

BACKGROUND OF THE INVENTION

1. Field of the Invention

The present invention relates to an auto-focusing apparatus suitable for a surveying instrument such as an automatic level, a theodolite, a transit, etc., that is provided with a sighting telescope.

2. Description of the Related Art

In recent years various types of surveying instruments provided with a passive AF (auto-focusing) apparatus have been developed. In these types of surveying instruments, the sighting telescopic optical system is provided with a split optical path which branches off from the main optical path. The image of an object (sighting object) formed in the split optical path at a position, optically equivalent to the position at which the focusing plate is placed, is separated into two by a pair of separator lenses to be respectively re-formed onto a pair of sensors. Each photoelectric converting element provided on each sensor converts the received light into an electric charge and accumulates the electric charge. The accumulated electric charges are output in order at every photoelectric conversion element as AF sensor data. A predetermined operation is performed in accordance with the AF sensor data to determine the phase difference between a pair of images respectively formed on the pair of sensors. Furthermore, an object distance or amount of defocus that is necessary for bringing the sighting object into focus is calculated through a predetermined operation in accordance with the determined phase difference. A focusing optical system is driven to bring the sighting object into focus in accordance with the calculated object distance or amount of defocus. In some surveying instruments, if the phase difference cannot be determined, a process in which the pair of sensors are controlled so that each photoelectric converting element thereof converts the received light into an electric charge and accumulates (integrates) the electric charge to obtain AF sensor data while the focusing optical system is driven to move, and subsequently, the phase-difference determining operation is performed in accordance with the obtained AF sensor data, and is repeatedly performed until the phase difference is determined.

The focus detection range (object distance range) of the sighting telescopic optical system of a surveying instrument from an infinite distance to the close-up extremity is very wide, so that the moving range of the focusing optical system is long (approximately 30 mm if the focusing optical system is made up of an concave lens). Therefore, in the phase-difference determining operation performed in accordance with the AF sensor data obtained by performing an integrating operation once, since the object distance range in which the phase difference can be determined is short, the integrating operation and the phase-difference determining operation have to be repeatedly performed many times while the focusing optical system is driven to move. This takes a long time for the sighting object to be brought into focus.

SUMMARY OF THE INVENTION

The primary object of the present invention is to provide an auto-focusing apparatus which makes it possible to reduce time taken to bring the sighting object into focus.

To achieve the object mentioned above, according to an aspect of the present invention, an auto-focusing apparatus is provided including a light receiving device having at least one array of photoelectric conversion elements, the light receiving device separating an image of an object formed via an optical system into two separate images to re-form the two separate images on the at least one array of photoelectric conversion elements so as to output two sets of image data, the optical system including a focusing optical system; a driving device which drives the focusing optical system along an optical axis thereof; an operation device which performs a predetermined operation for determining a phase difference between the two separate images while shifting at least part of one of the two sets of image data relative to the other of the two sets of image data; and a controller which limits a range of shifting of the at least part of one of the two sets of image data relative to the other of the two sets of image data in accordance with an amount of movement of the focusing optical system and a moving direction thereof, when the operation device performs the predetermined operation in accordance with the two sets of image data output from the light receiving device while the driving device drives the focusing optical system along the optical axis.

In an embodiment, the controller which does not limit the range when the operation device performs the predetermined operation in accordance with the two sets of image data output from the light receiving device while the driving device does not drive the focusing optical system along the optical axis.

In an embodiment, with reference to a relative position between the two sets of image data at which the two sets of image data for the two separate images are in phase with each other when the optical system is focused on the object, the operation device performs the predetermined operation to determine the phase difference while shifting the at least part of one of the two sets of image data relative to the other of the two sets of image data in a first direction capable of determining a phase difference between the two separate images, which correspond to the two separate images, of an object positioned nearer than the in-focus object, and in a second direction capable of determining a phase difference between two separate images, which correspond to the two separate images, of an object positioned farther than the in-focus object. Preferably, the operation device performs the predetermined operation to determine the phase difference while shifting the at least part of one of the two sets of image data relative to the other of the two sets of image data in steps of one pixel.

In an embodiment, the operation device performs the predetermined operation to determine the phase difference while shifting the at least part of one of the two sets of image data relative to the other of the two sets of image data, with the other of the two sets of image data being stationary, in a first direction capable of determining a phase difference between two separate images, which correspond to the two separate images, of an object at a near distance, and in a second direction capable of determining a phase difference between two separate images, which correspond to the two separate images, of an object at a far distance. Preferably, the operation device performs the predetermined operation to determine the phase difference while shifting the at least part of one of the two sets of image data relative to the other of the two sets of image data in steps of one pixel.

In an embodiment, when the operation device performs the predetermined operation to determine the phase difference while shifting the at least part of one of the two sets of image data relative to the other of the two sets of image data in one of the first direction and the second direction, the operation device limits a first secondary range in the range of shifting of the at least part of one of the two sets of image data relative to the other of the two sets of image data, wherein a phase difference between two separate images, which correspond to the two separate images, of the object at a far distance can be detected in the first secondary range in accordance with an amount of movement of the focusing optical system when the driving device drives the focusing optical system along the optical axis in a direction of bringing the object at a near distance into focus; the operation device limits a second secondary range in the range of shifting of the at least part of one of the two sets of image data relative to the other of the two sets of image data, wherein a phase difference between two separate images, which correspond to the two separate images, of the near distance object can be detected in the second secondary range in accordance with an amount of movement of the focusing optical system when the driving device drives the focusing optical system along the optical axis in a direction of bringing the far distance object into focus; and the operation device performs the predetermined operation to determine the phase difference between the two separate images while shifting the at least part of one of the two sets of image data relative to the other of the two sets of image data within one of the first secondary range and the second secondary range that is not limited by the operation device.

In an embodiment, the operation device performs an operation for calculating the difference between two image data of two adjacent pixels on every pair of two adjacent pixels of each of the two sets of image data and further calculates the sum of the absolute values of the calculated differences while shifting the at least part of one of the two sets of image data relative to the other of the two sets of image data in pixels. The operation device performs a correlation operation in accordance with the calculated the sum of the absolute values to determine the phase difference, and the operation device determines the amount of movement of the focusing optical system and the moving direction thereof in accordance with the determined phase difference.

In an embodiment, the shifting range limited by the controller corresponds to a part of an overlapping portion between a first shifting range before the focusing lens group is driven by the driving device, and a second shifting range after the focusing lens group is driven by the driving device. Preferably, the shifting range limited by the controller corresponds to at least part of the overlapping portion, and wherein a degree of reliability of the phase difference determined by the operation device before the focusing optical system is driven by the driving device is considered high in the at least part of the overlapping portion.

In an embodiment, the shifting range limited by the controller corresponds to an overlapping portion between a first shifting range before the focusing lens group is driven by the driving device, and a second shifting range after the focusing lens group is driven by the driving device. Preferably, the shifting range limited by the controller corresponds to at least part of the overlapping portion, and wherein a degree of reliability of the phase difference determined by the operation device before the focusing optical system is driven by the driving device is considered high in the at least part of the overlapping portion.

Preferably, the auto-focusing apparatus is incorporated in a surveying instrument.

According to another aspect of the present invention, a surveying instrument is provided including a telescopic optical system having a main optical path and a split optical path which branches off from the main optical path, the telescopic optical system including a focusing lens group guided along an optical axis thereof; a focus detector having a passive AF sensor positioned so that light traveling from the main optical path to the split optical path is incident on the focus detector, the passive AF sensor including at least one array of photoelectric conversion elements, the focus detector separating an image of an object formed via the telescopic optical system into two separate images to re-form the two separate images on the at least one array of photoelectric conversion elements so as to output two sets of image data; a driving device which drives the focusing lens group along the optical axis for focusing; an operation device which performs a predetermined operation for determining a phase difference between the two separate images while shifting at least part of one of the two sets of image data relative to the other of the two sets of image data; and a controller which limits a range of shifting of the at least part of one of the two sets of image data relative to the other of the two sets of image data in accordance with an amount of movement of the focusing lens group and a moving direction thereof when the operation device performs the predetermined operation in accordance with the two sets of image data output from the focus detector while the driving device drives the focusing lens group system along the optical axis.

According to another aspect of the present invention, an auto-focusing apparatus is provided including a light receiving device including at least one array of photoelectric conversion elements and separating an image of an object formed via an optical system into two separate images to re-form the two separate images on the at least one array of photoelectric conversion elements so as to output two sets of image data, the optical system including a focusing optical system; a driving device which drives the focusing optical system along an optical axis thereof; a detecting device which detects a phase difference between the two separate images re-formed on the array of photoelectric conversion elements by the two sets of image data; and a controller which limits a area of the array of photoelectric conversion elements to detect the phase difference in accordance with an amount of movement of the focusing optical system and a moving direction thereof when the detection device performs the detection operation in accordance with the two sets of image data output from the array of photoelectric conversion elements while the driving device drives the focusing optical system along the optical axis.

In an embodiment, the controller which does not change the area of the array of photoelectric elements when the detecting device performs the operation in accordance with the two sets of image data output from the light receiving device while the driving device does not drive the focusing optical system along the optical axis.

In an embodiment, the controller changes the area of the array of photoelectric elements to a larger area in accordance with a larger amount of movement of the focusing optical system; and a predetermined calculation process is performed to obtain a phase difference from a reference pixel position to a position subtracted from a predetermined maximum data shifting amount, only by a data shifting amount, in a direction depending on a moving direction of the focusing lens group, to obtain a calculation starting pixel position.

The present disclosure relates to subject matter contained in Japanese Patent Application No. 11-276575 (filed on Sep. 29, 1999) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
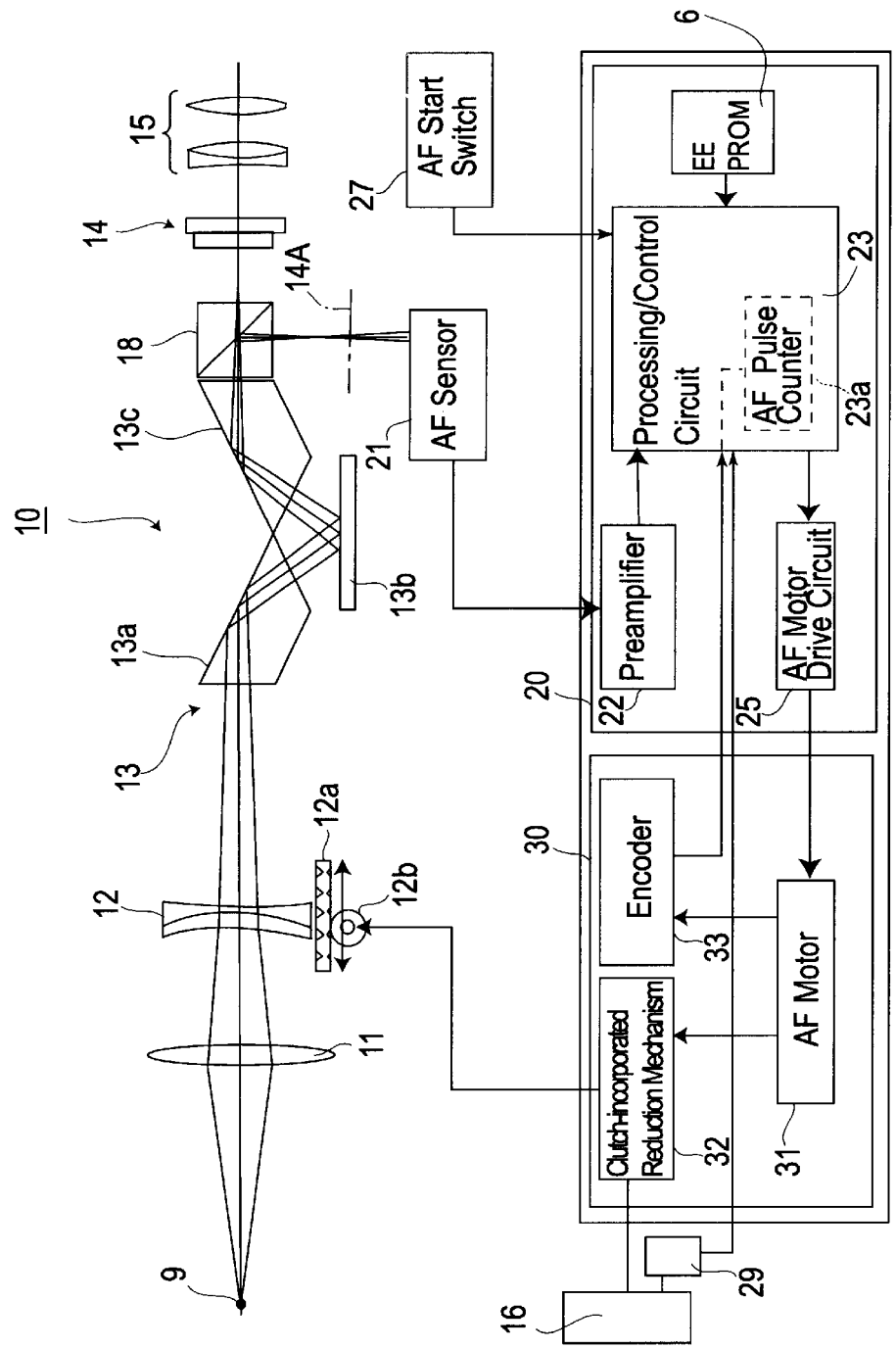
FIG. 1 is a schematic diagram showing fundamental elements of an embodiment of an automatic level to which the present invention is applied.

FIG. 1 shows an embodiment of an automatic level to which the present invention is applied. The automatic level (surveying apparatus) 10 is provided with a telescopic optical system (sighting telescope) which includes a positive objective lens group 11, a negative focusing lens group 12, a horizontal compensating optical system 13, a focusing plate (focal plane) 14, and a positive eyepiece lens 15, in that order from the object side (i.e., left to right as viewed in FIG. 1).

The horizontal compensating optical system 13, per se known, is provided with a first compensating prism 13a, a compensating mirror 13b and a second compensating prism 13c, and has a symmetrical shape with respect to the center of the compensating mirror 13b. The horizontal compensating optical system 13 hangs from a cord/string (not shown) attached to a shaft (not shown). The absolute angles between the compensating mirror 13b and the first and second compensating prisms 13a and 13c are the same, however, signs (i.e., "+" or "−") of the actual angles thereof are opposite. The angle of the compensating mirror 13b relative to either compensating prism 13a or 13c can be, for example, thirty degrees. This angle varies depending on predetermined factors such as the length of the above-mentioned cord/string from which the horizontal compensating optical system 13 hangs.

If the automatic level is set with an optical axis O of the objective lens group 11 and the focusing lens group 12 extending almost horizontally but being slightly inclined to a real horizontal plane by an angle of ten to fifteen minutes, the light beam that is passed through the objective lens group 11 and the focusing lens group 12 to be incident on the first compensating prism 13a is also inclined to the real horizontal plane by the same angle. However, the light beam that emerges from the second compensating prism 13c after having been reflected by the first compensating prism 13a, the compensating mirror 13b and the second compensating prism 13c, has substantially no inclination relative to the real horizontal plane.

A rack 12a is fixed to the focusing lens group 12, while a pinion 12b is engaged with the rack 12a, so that rotating the pinion 12b causes the focusing lens group 12 to move along the optical axis O via the rack 12a. Therefore, the image of an object (sighting object) 9 that is formed through the objective lens group 11 and the focusing lens group 12 can be moved along the optical axis by rotating the pinion 12b. The image of the object 9 which is focused on the focusing plate 14 is magnified by the eyepiece lens 15, so that the user of the automatic level 10 sights the magnified image of the object 9 through the eyepiece lens 15. The focusing plate 14 is provided thereon with a reticle (not shown).

The automatic level 10 is provided between the second compensating prism 13c and the focusing plate 14 with a beam splitter (half-mirror) 18 that splits a bundle of light incident thereon into two light bundles. Part of the light emitted from the horizontal compensating optical system 13 is reflected by the beam splitter 18 at right angles towards a passive AF sensor (light receiving device/focus detector) 21 provided near the beam splitter 18. A reference focal plane 14A is formed between the beam splitter 18 and the AF sensor 21, and is located at a position optically equivalent to the position at which the focusing plate 14 is placed. The automatic level 10 is further provided with a focus state detecting system 20 and a focusing lens group driving system 30. The focus state detecting system 20 detects the focus state on the reference focal plane 14A via the AF sensor 21. The focusing lens group driving system 30 controls the focusing lens group 12 to move along the optical axis 0 in accordance with the signal received from the focus state detecting system 20. The focusing lens group driving system 30, the 12a and the 12b constitute a focusing lens group driving device.

Figure 2:
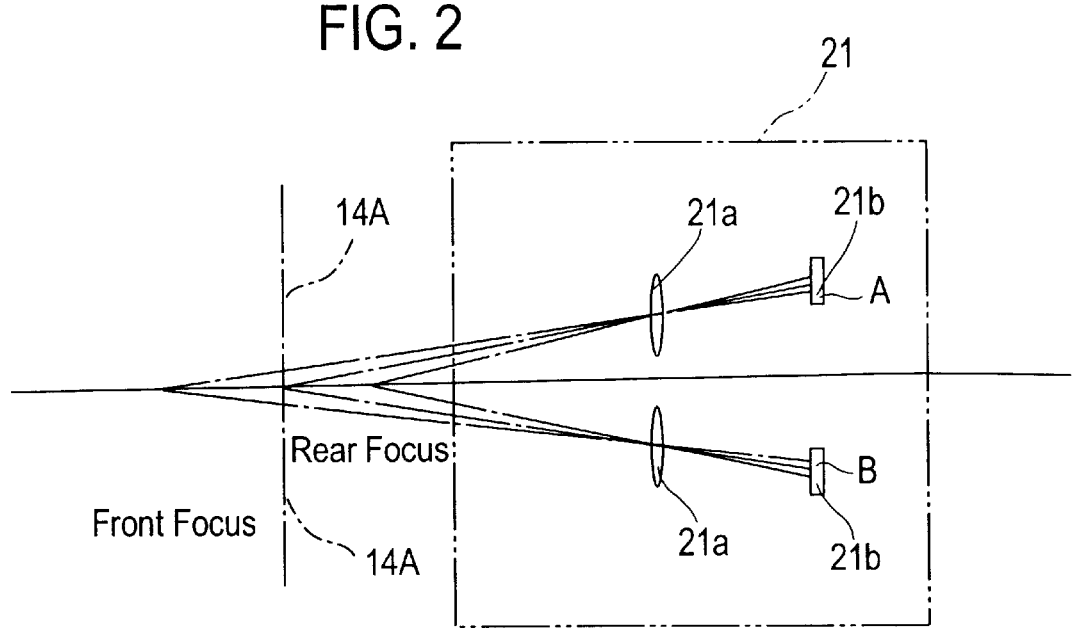
FIG. 2 is an explanatory view of an embodiment of an AF sensor provided in the automatic level shown in FIG. 1.

The focus state detecting system 20 includes a preamplifier 22, a processing/control circuit (operation device/controller) 23, an EEPROM 6 and an AF-motor drive circuit 25. The focusing lens group driving system 30 includes an AF motor 31, a clutch-incorporated reduction mechanism 32 and an encoder 33. The AF sensor 21 is positioned in the vicinity of the reference focal plane 14A and is connected to the focus state detecting system 20. The focus state detecting system 20 determines the phase difference in accordance with AF sensor data (image data) output from the AF sensor 21, and calculates the amount of defocus in accordance with the determined phase difference. In this embodiment, the AF sensor 21 is a phase-difference detection photosensor and includes a pair of separator lenses (a pair of imaging lenses) 21a, and a pair of line sensors (a pair of multi-segment CCD sensors) 21b located behind the respective separator lenses 21a (see FIG. 2). In the following discussion, one of the pair of line sensors 21b (the upper line sensor 21b as viewed in FIG. 2) is also referred to as "A-sensor", while the other line sensor 21b (the lower line sensor 21b as viewed in FIG. 2) is also referred to as "B-sensor", as shown in FIG. 2. The image of the object formed on the reference focal plane 14A is separated into two by the pair of separator lenses 21a to be respectively re-formed on the pair of line sensors 21b. The phase difference (space) between the pair of images respectively formed on the pair of line sensors 21b varies depending on the focus state of the object image on the reference focal plane 14A. Namely, the phase difference is small when an image of the object 9 is focused on a plane in front of the reference focal plane 14A (i.e., a front focus state), while the phase difference is large when an image of the object 9 is focused on a plane behind the reference focal plane 14A (i.e., a rear focus state), with reference to the case when an image of the object 9 is precisely focused on the reference focal plane 14A. Accordingly, the amount of deviation of a focal point relative to the reference focal plane 14A (i.e., the amount of defocus) can be determined from the phase difference between the pair of images respectively formed on the pair of line sensors 21b.

Although the details are not illustrated, each line sensor 21b includes an array of photoelectric converting elements (light receiving elements). Each photoelectric converting element converts the received light into an electric charge and integrates (accumulates) the electric charge. The integrated electric charges are output in order at every photoelectric conversion element as AF sensor data (image data).

The AF sensor 21 is provided with a monitoring sensor (not shown) positioned adjacent to the pair of line sensors 21b. The monitoring sensor is used to control the integral action time in accordance with the brightness of the image formed on each line sensor 21b. The processing/control circuit (controller) 23 controls the integral action time of each line sensor 21b, i.e., controls the timing of completion of the integrating operation of each line sensor 21b, in accordance with the output of the monitoring sensor.

The AF sensor data output from the AF sensor 21 are amplified by the preamplifier 22 to be input to the processing/control circuit 23. The processing/control circuit 23 calculates an amount of defocus in accordance with two sets of AF sensor data (two sets of image data) respectively input from the pair of line sensors 21b. Furthermore, in this embodiment, the amount of driving of the AF motor 31 (the number of pulses output from the encoder 33, which is hereinafter referred to as "the number of AF pulses") and the driving direction thereof which are necessary for moving the focusing lens group 12 to an axial position thereof, at which the amount of defocus becomes zero, are respectively calculated and determined in accordance with the amount of defocus calculated by the processing/control circuit 23. The number of AF pulses is registered in an AF pulse counter 23a in the processing/control circuit 23 (see FIG. 1).

The processing/control circuit 23 drives the AF motor 31 via the AF-motor drive circuit 25 in accordance with the calculated number of AF pulses and the determined driving direction of the AF motor 31. Rotation of the AF motor 31 is transmitted to the pinion 12b via the clutch-incorporated reduction mechanism 32 to move the focusing lens group 12 (see FIG. 1).

Rotation of the AF motor 31 is detected by the encoder 33 while the output of the encoder 33 is counted by the processing/control circuit 23 to control the rotational speed of the AF motor 31 or stop the AF motor 31 in accordance with the counted output value and the calculated amount of driving the AF motor 31. The processing/control circuit 23 controls the focus state detecting system 20 and the focusing lens group driving system 30 to detect the focus state of the object image formed on the reference focal plane 14A, and subsequently moves the focusing lens group 12 along the optical axis 0 to bring the sighting object into focus.

An AF start switch (AF start operational button) 27 for starting an auto-focusing process ("AF PROCESS" shown in FIG. 10) is connected to the processing/control circuit 23. An AF mode detecting switch 29 for detecting whether the focusing mode is an AF mode (i.e., whether the focusing mode is not an MF (manual focusing) mode) is connected to the processing/control circuit 23. The AF start switch 27 is a self-reset push button switch. Namely, the AF start switch 27 is turned ON upon being depressed by the user, while the AF start switch 27 is turned OFF upon the pressing force applied to the AF start switch 27 being released therefrom. The automatic level 10 is provided with a focus operation knob 16 which turns ON and OFF the AF mode detecting switch 29 upon being depressed into, and pulled out of, the body of the automatic level 10, respectively.

The pinion 12b can be driven either manually by an operation of the focus operation knob 16 to carry out the manual focusing operation, or by the AF motor 31 according to the control of the focus state detecting system 20 and the focusing lens group driving system 30. In the automatic level 10, depressing the focus operation knob 16 into the body of the automatic level 10 causes the clutch-incorporated reduction mechanism 32 to couple the AF motor 31 with the pinion 12b, so that the auto-focusing (AF) mode is selected in which the focusing lens group 12 is driven according to the output of the focus state detecting system 20, while pulling the focus operation knob 16 out of the body of the automatic level 10 causes the clutch-incorporated reduction mechanism 32 to couple the focus operation knob 16 with the pinion 12b, so that the manual focusing (MF) mode is selected in which the focusing lens group 12 is driven by manually rotating the focus operation knob 16. The processing/control circuit 23 determines that the AF mode has been selected by detecting that the AF switch 29 is ON.

A defocus amount calculating process ("DEFOCUS AMOUNT CALCULATION" shown in FIG. 14) performed by the processing/control circuit 23 will be hereinafter discussed based on the above discussed structure of the automatic level 10. Although the processing/control circuit 23 performs the defocus amount calculating process in accordance with two sets of AF sensor data respectively input from the pair of line sensors 21b, in the following discussion, the two sets of AF sensor data are regarded as "A-sensor data" and "B-sensor data", respectively output from the A-sensor and the B-sensor.

In the defocus amount calculating process, firstly a contrast calculation is performed in accordance with the two sets of AF sensor data respectively output from the A-sensor and the B-sensor. In the contrast calculation, for instance, regarding the A-sensor, the sum of the absolute values of the differences between the two sensor data (integral values) of every pair of two adjacent pixels (photoelectric converting elements) is used. Specifically, it is determined that there is sufficient contrast if the sum is equal to, or greater than, a predetermined value; while it is determined that there is no contrast if the sum is smaller than the predetermined value. Correlation operation is performed to determine a phase difference between the A-sensor data and the B-sensor data only when it is determined that there is sufficient contrast.

Figure 3:
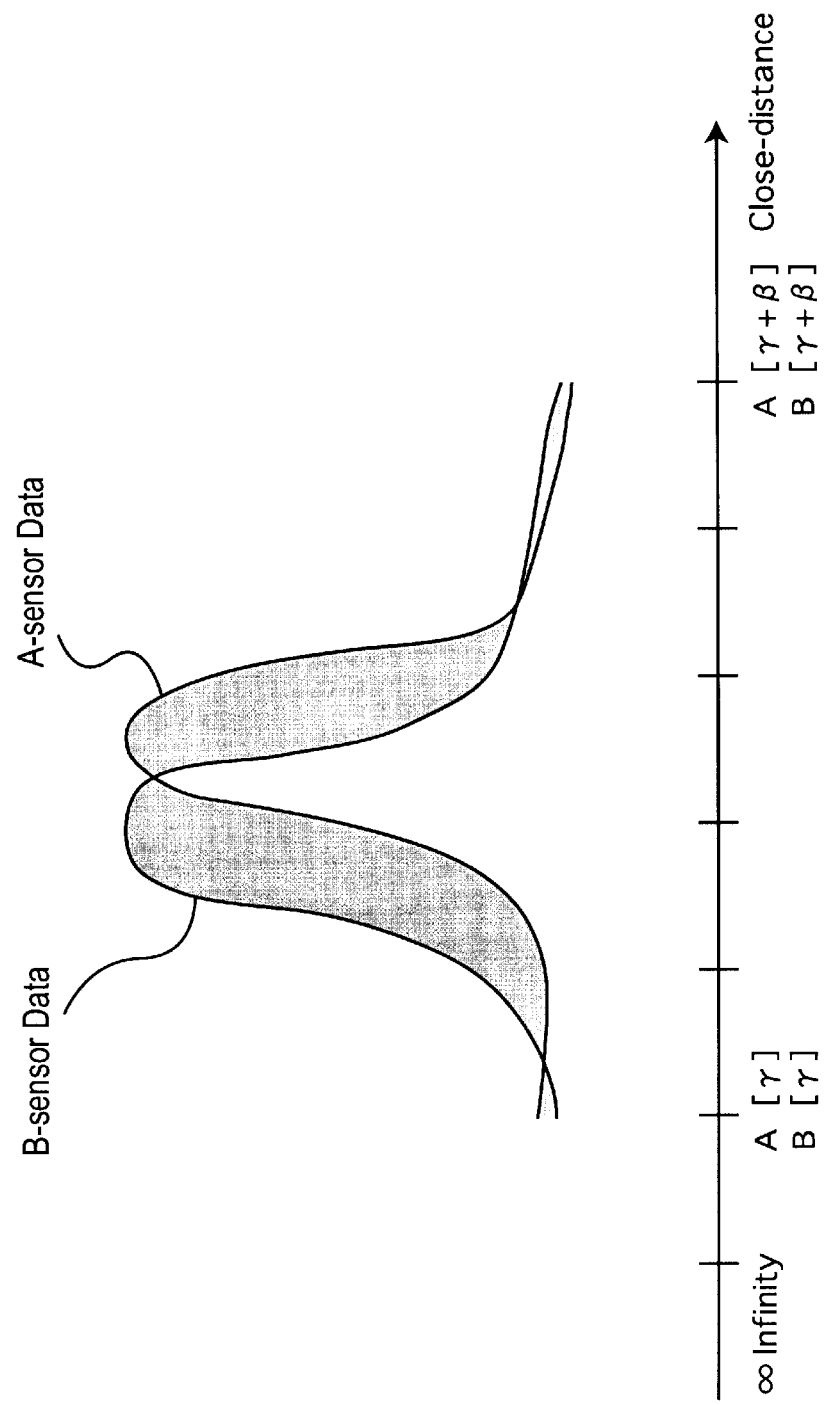
FIG. 3 is an explanatory view of the sum of the absolute values of the differences between the two sets of sensor data (integral values) of every pair of two adjacent pixels (photoelectric converting elements)

Assuming that A[0] through A[α] represent the positions of the pixels of the A-sensor data, which respectively coincide with the positions of the photoelectric converting elements of the A-sensor, that B[0] through B[α] represent the positions of the pixels of the B-sensor data, which respectively coincide with the positions of the photoelectric converting elements of the B-sensor, that "β" (<α) represents the number of those pixels of each of the A-sensor and the B-sensor which are actually used in the correlation operation, and that A[γ]and B[γ] represent the reference pixel positions of the A-sensor data and the B-sensor data, respectively; if the correlation operation starts at each of the reference pixel positions A[γ] and B[γ], firstly the B-sensor data is mathematically overlaid on the A-sensor data so that the pixel positions A[γ] through A[γ+β] of the A-sensor data respectively coincide with the pixel positions B[γ] through By [γ+β] of the B-sensor data. Subsequently, the difference between the two sensor data (integral values) of two adjacent pixels (photoelectric converting elements) on every pair of two adjacent pixels is calculated, and the sum of the absolute values of the calculated differences is calculated. In this operation, the sum of the absolute values of the calculated differences corresponds to the shaded portion in FIG. 3.

Figure 4:
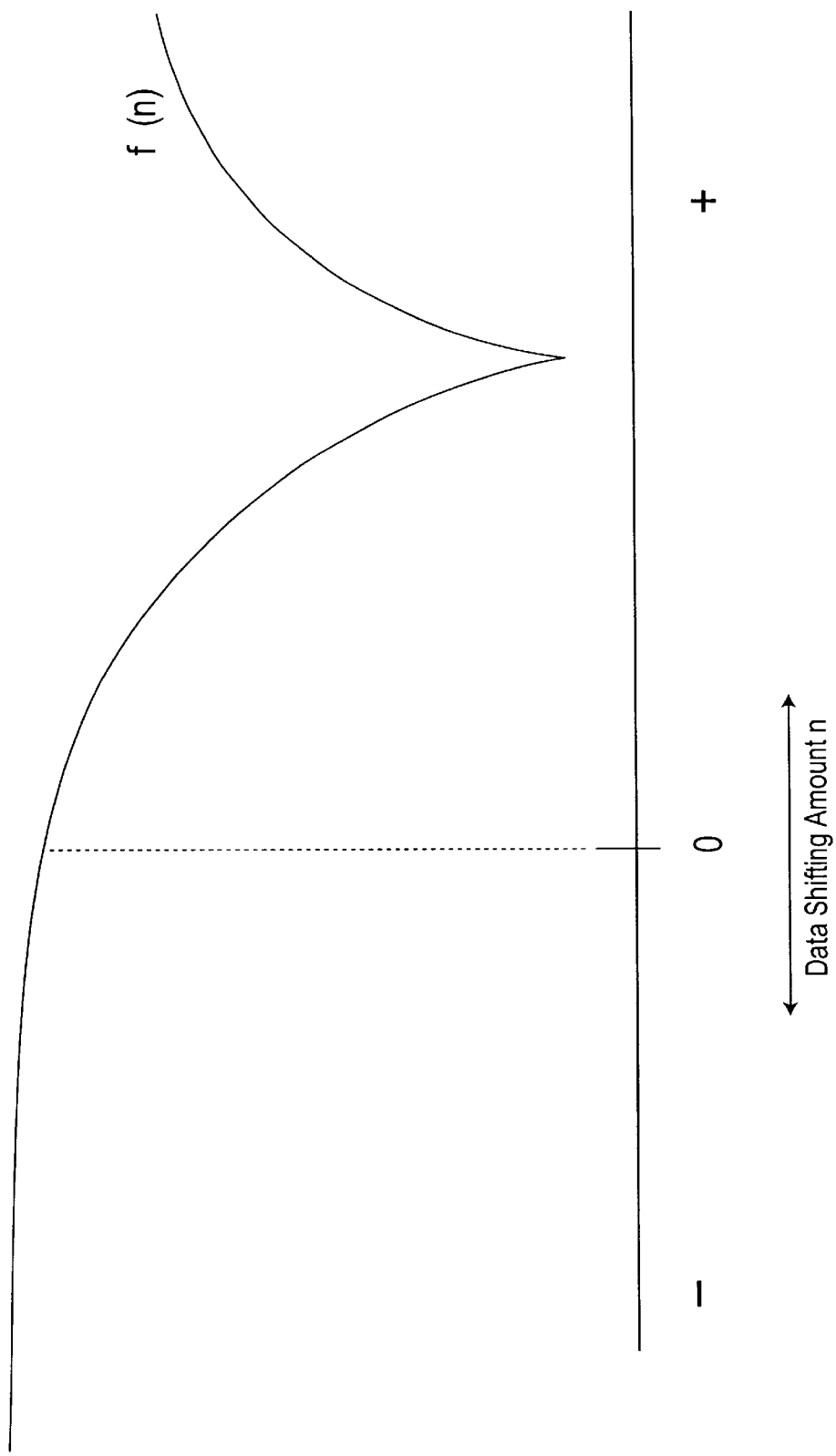
FIG. 4 is a graph showing a correlation function f(n) derived from two sets of AF sensor data respectively output from the AF sensor shown in FIG. 2.

Thereafter, the B-sensor data are again mathematically overlaid on the A-sensor data with either the A-sensor data or the B-sensor data being shifted relative to the other by a predetermined number of pixels n (data shifting amount) to again calculate the sum of the absolute values of the calculated differences in the above-mentioned manner. Specifically, in the present embodiment, the A-sensor data is regarded as the reference sensor data, so that only the B-sensor data is shifted relative to the A-sensor data. Hence, the B-sensor data is mathematically overlaid on the A-sensor data with the B-sensor data being shifted relative to the A-sensor data by a predetermined number of pixels "n" so that the pixel positions A[γ] through A[γ+β] of the A-sensor data respectively coincide with the pixel positions B[γ+n] through B[γ+β+n] of the B-sensor data; subsequently, the difference between the two sensor data (integral values) of two adjacent pixels (photoelectric converting elements) on every pair of two adjacent pixels is calculated, and the sum of the absolute values of the calculated differences is calculated. The sum of the absolute values of the calculated differences is calculated by changing the data shifting amount n in steps of a predetermined number of pixels until the data shifting amount n reaches a predetermined maximum amount thereof |±N| (hereinafter referred to as "maximum data shifting amount |±N|"). Consequently, a correlation function f(n) shown in FIG. 4 which indicates the degree of agreement of the two sets of AF sensor data is obtained. In the present embodiment, each of the numbers n and N is an integral number. The value n increases or decreases from zero in steps of one until it reaches the maximum data shifting amount |±N|.

If the sign (i.e., "+" or "−") of the data shifting amount n is positive, the B-sensor data is shifted to the close range side (i.e., to the right as viewed in FIG. 6A, 6B, 7A or 7B). Conversely, if the sign (i.e., "+" or "−") of the data shifting amount n is negative, the B-sensor data is shifted to the infinite distance side (i.e., to the left as viewed in FIG. 6A, 6B, 7A or 7B). Furthermore, in the present invention, the value of the correlation function f(n) becomes minimal at each of the pixel positions A[γ] and B[γ], i.e., at the position where the data shifting amount n is zero (n=0) at the time focus is achieved. Therefore, the value of the correlation function f(n) becomes minimal on the positive (+) side of the data shifting amount n when an image of the object 9 is focused on a plane behind the reference focal plane 14A (i.e., a rear focus state), whereas the value of the correlation function f(n) becomes minimal on the negative (−) side of the data shifting amount n when an image of the object 9 is focused on a plane in front of the reference focal plane 14A (i.e., a front focus state).

The processing/control circuit 23 detects the data shifting amount n as a phase difference which makes the correlation function f(n) have the minimum value to calculate the amount of defocus in accordance with the detected phase difference. However, if the correlation function f(n) has no minimum value, or more than one minimum value, the processing/control circuit 23 cannot determine the phase difference, and therefore cannot calculate the amount of defocus. In this case, in the present embodiment of the automatic level 10, a phase-difference determining operation is performed while the focusing lens group 12 is driven by the AF motor 31.

Figure 5:
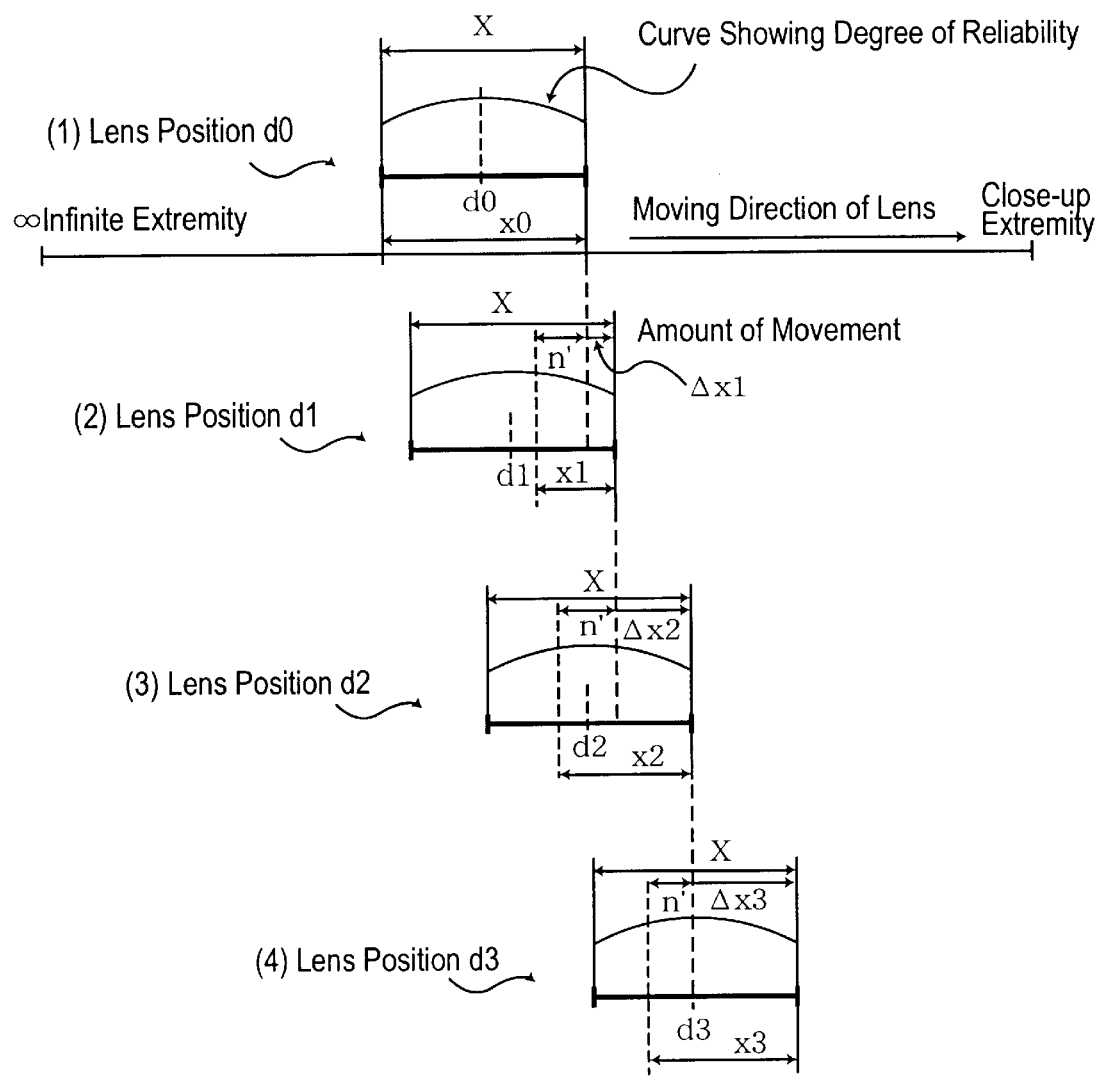
FIG. 5 is a diagram showing a relationship among the axial positions of the focusing lens group provided in the automatic level shown in FIG. 1, a phase difference detectable range X and a phase difference detection range x.

This operation will be hereinafter discussed in detail with reference to FIGS. 5 through 7. FIG. 5 shows the relationship among the axial position of the focusing lens group 12 between the close-up extremity and the infinite extremity. A phase difference detectable range 'X' is a range in which the focusing lens group 12 has to be positioned for focusing and corresponds to the maximum range of detection of a phase difference when the focusing lens group 12 is located at an axial position $d_n$ thereof ($d_0$, $d_1$, $d_2$ or $d_3$ in the particular case shown in FIG. 5). A phase difference detection range x is another range in which the focusing lens group 12 has to be positioned for focusing and corresponds to the maximum range of detection of a phase difference within the range of the maximum data shifting amount |±N|. The correlation operation is performed within the range of the maximum data shifting amount |±N|; i.e., the phase difference detection range x ($x_1$, $x_2$ or $x_3$ in the particular case shown in FIG. 5).

The phase difference detectable range X is a constant range that is determined by the number of pixels of each of the A-sensor and the B-sensor which are used in the correlation operation, and the data shifting amount M of the time the correlation operation. The phase difference detection range x is a variable range that is varied according to the amount of movement of the focusing lens group 12 and the moving direction thereof and which is determined by setting the aforementioned maximum data shifting amount |±N|. If the data shifting amount M is set equal to the aforementioned maximum data shifting amount |±N|, the phase difference detection range x becomes identical to the phase difference detectable range X.

Figure 6A:
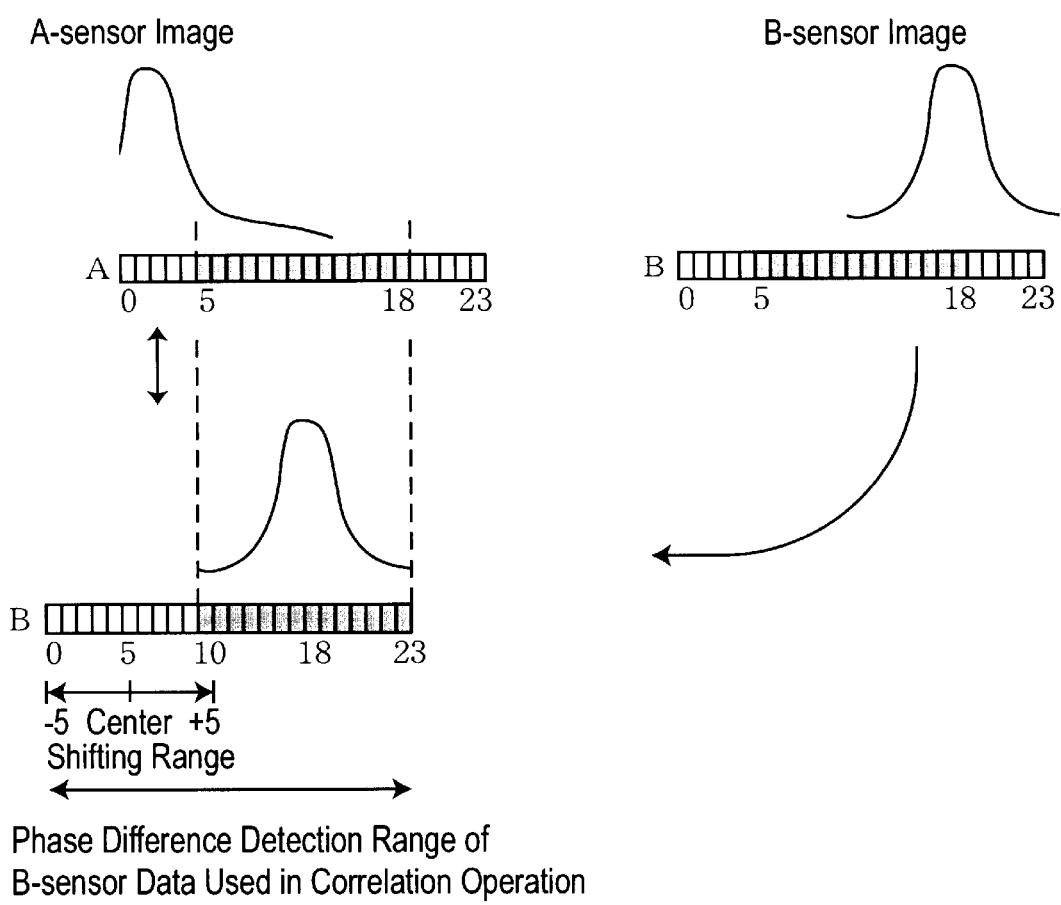
FIG. 6A is a diagram showing a relationship among two sets of AF sensor data respectively output from the AF sensor shown in FIG. 2 and the phase difference detection range.
Figure 6B:
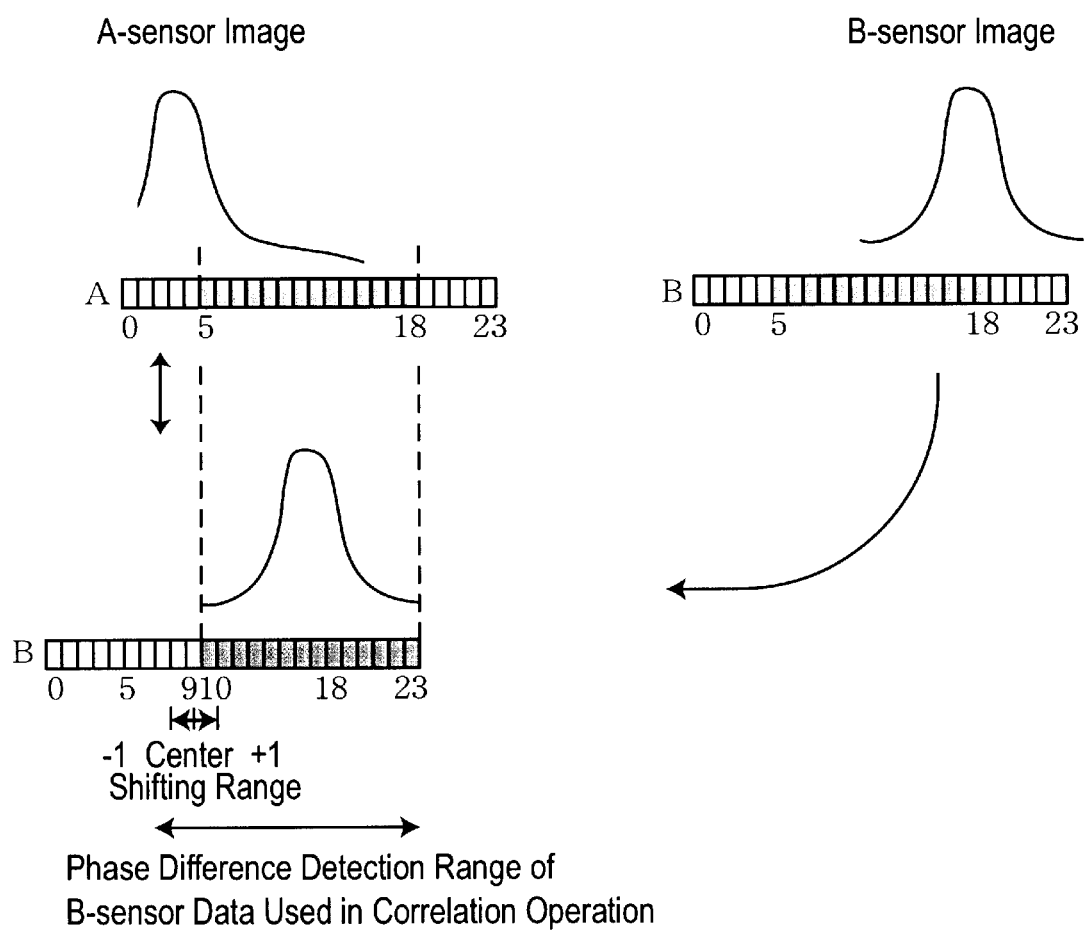
FIG. 6B is a diagram showing a relationship among two sets of AF sensor data respectively output from the AF sensor shown in FIG. 2 and the phase difference detection range.

FIG. 5(1) and FIG. 6A show a state where the B-sensor data is mathematically overlaid on the A-sensor data with the B-sensor data being shifted by the maximum data shifting amount |±N| to the close range side (to the right as viewed in FIG. 6A) when the focusing lens group 12 is located at the position d0. In the present embodiment, the total number of pixels of the A-sensor data is 24, wherein the pixels are represented by A[0] through A[23] as shown in FIG. 6. Likewise, the total number of pixels of the B-sensor data is 24, wherein the pixels are represented by B[0] through B[23] as shown in FIG. 6. Furthermore, the number of pixels of each of the A-sensor and the B-sensor (i.e., the number of pixel data) which are actually used in the correlation operation is 14, the data shifting amount M is set at |5|, and the reference pixel positions A[γ] and B[γ] of the A-sensor data and the B-sensor data are set at A[5] and B[5], respectively. In practice, the total number of pixels of the A-sensor data, each of the aforementioned numbers (the number of those pixels of each of the A-sensor and the B-sensor which are actually used in the correlation operation and the data shifting amount M) is generally much greater than the aforementioned number, generally several times to several tens of times of the aforementioned number.

In the present embodiment, upon the commencement of detection of a focus point, firstly the reference pixel positions A[5] and B[5] are set as the correlation operation commencing positions, while the maximum data shifting amount |±N| is set at |±5| (the data shifting amount M), so that the phase difference detection range x corresponds with the phase difference detectable range X. Subsequently, the B-sensor data is mathematically overlaid on the A-sensor data so that the pixel positions A[5] through A[18] of the A-sensor data respectively coincide with the pixel positions B[5] through B[18] of the B-sensor data without the B-sensor data being shifted relative to the A-sensor data (i.e., the data shifting amount n=0). The difference between the two sensor data (integral values) of two adjacent pixels (photoelectric converting elements) on every pair of two adjacent pixels is calculated, and the sum of the absolute values of the calculated differences is calculated. Subsequently, the B-sensor data is mathematically overlaid on the A-sensor data so that the pixel positions A[5] through A[18] of the A-sensor data respectively coincide with the pixel positions B[6] through B[19] of the B-sensor data with the B-sensor data being shifted relative to the A-sensor data by +1 (the data shifting amount n=1), the difference between the two sensor data (integral values) of two adjacent pixels (photoelectric converting elements) on every pair of two adjacent pixels is calculated, and the sum of the absolute values of the calculated differences is calculated. Subsequently, the B-sensor data is mathematically overlaid on the A-sensor data so that the pixel positions A[5] through A[18] of the A-sensor data respectively coincide with the pixel positions B[4] through B[17] of the B-sensor data with the B-sensor data being shifted relative to the A-sensor data by −1 (the data shifting amount n=−1), the difference between the two sensor data (integral values) of two adjacent pixels (photoelectric converting elements) on every pair of two adjacent pixels is calculated, and the sum of the absolute values of the calculated differences is calculated. Subsequently, a similar operation (in which the B-sensor data is mathematically overlaid on the A-sensor data with the B-sensor data being further shifted relative to the A-sensor data by plus one [to the right by one pixel as viewed in FIG. 6] or minus one [to the left by one pixel as viewed in FIG. 6], the difference between the two sensor data [integral values] of two adjacent pixels [photoelectric converting elements] on every pair of two adjacent pixels is calculated, and the sum of the absolute values of the calculated differences is calculated) is repeated by increasing the data shifting amount n from zero in steps of one until the data shifting amount n reaches the maximum data shifting maximum |5|, and decreasing the data shifting amount n from zero in steps of one until the data shifting amount n reaches the maximum data shifting maximum |−5| (see FIGS. 5(1) and 6A).

Accordingly, in the present embodiment, upon the commencement of detection of a focus point, the pixels B[0] through B[23] of the B-sensor data are used, while the correlation operation is repeated eleven times in total for the whole range of the phase difference detectable range X of the B-sensor.

Thereafter, the correlation function f(n) is derived from the result of the correlation operation. If the derived correlation function f(n) has only one minimum value, the data shifting amount n is detected as the phase difference between A-sensor data and the B-sensor data which makes the correlation function f(n) have the minimum value to calculate the amount of defocus in accordance with the detected phase difference. Note that the phase difference which makes the correlation function f(n) have the minimum value is calculated to the fractional portion of the number, to a predetermined number of significant decimal places, by interpolation.

Figure 10:
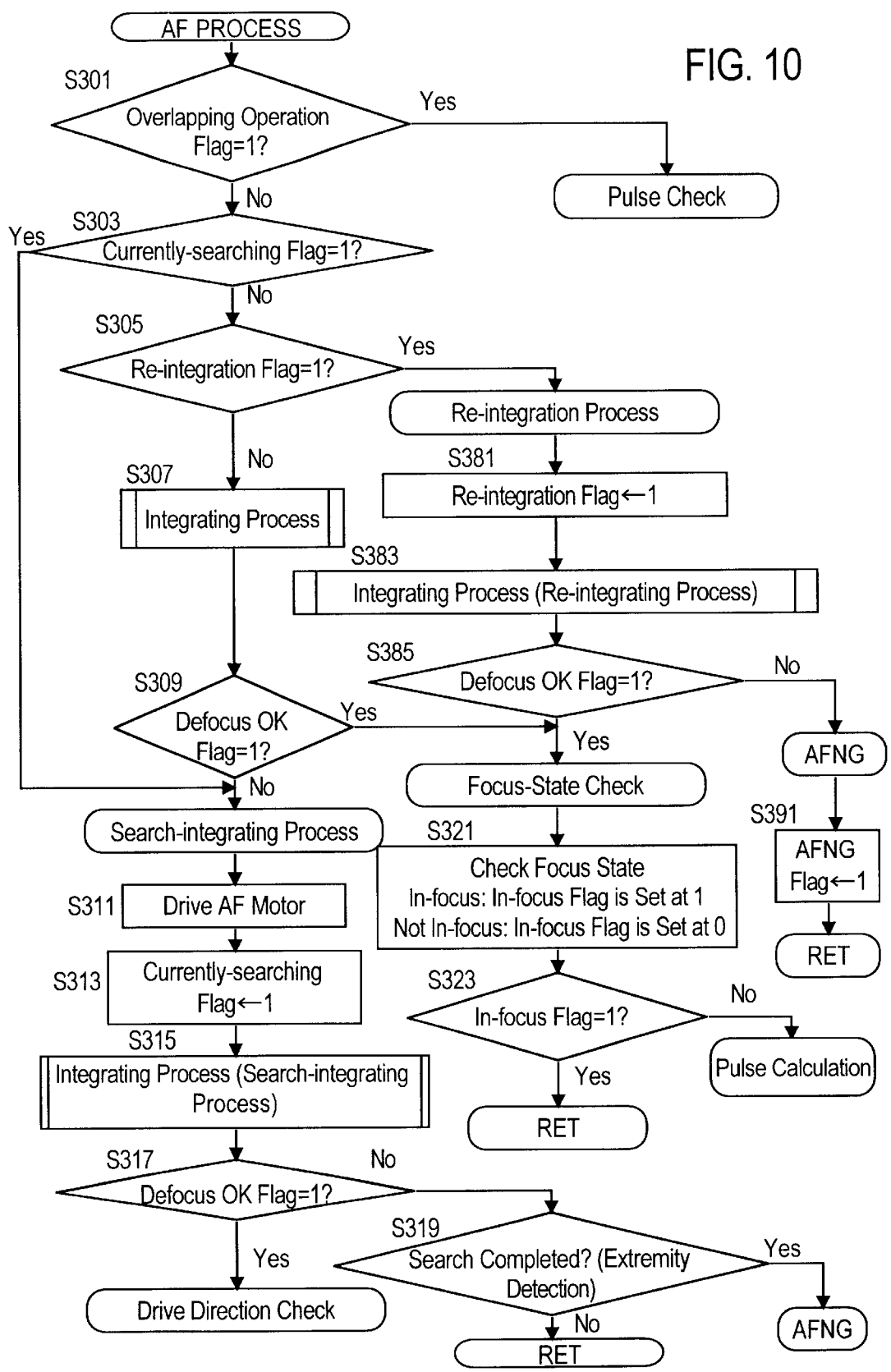
FIG. 10 is a flow chart showing another part of the main process (AF PROCESS) that is performed in the automatic level shown in FIG. 1.
Figure 11:
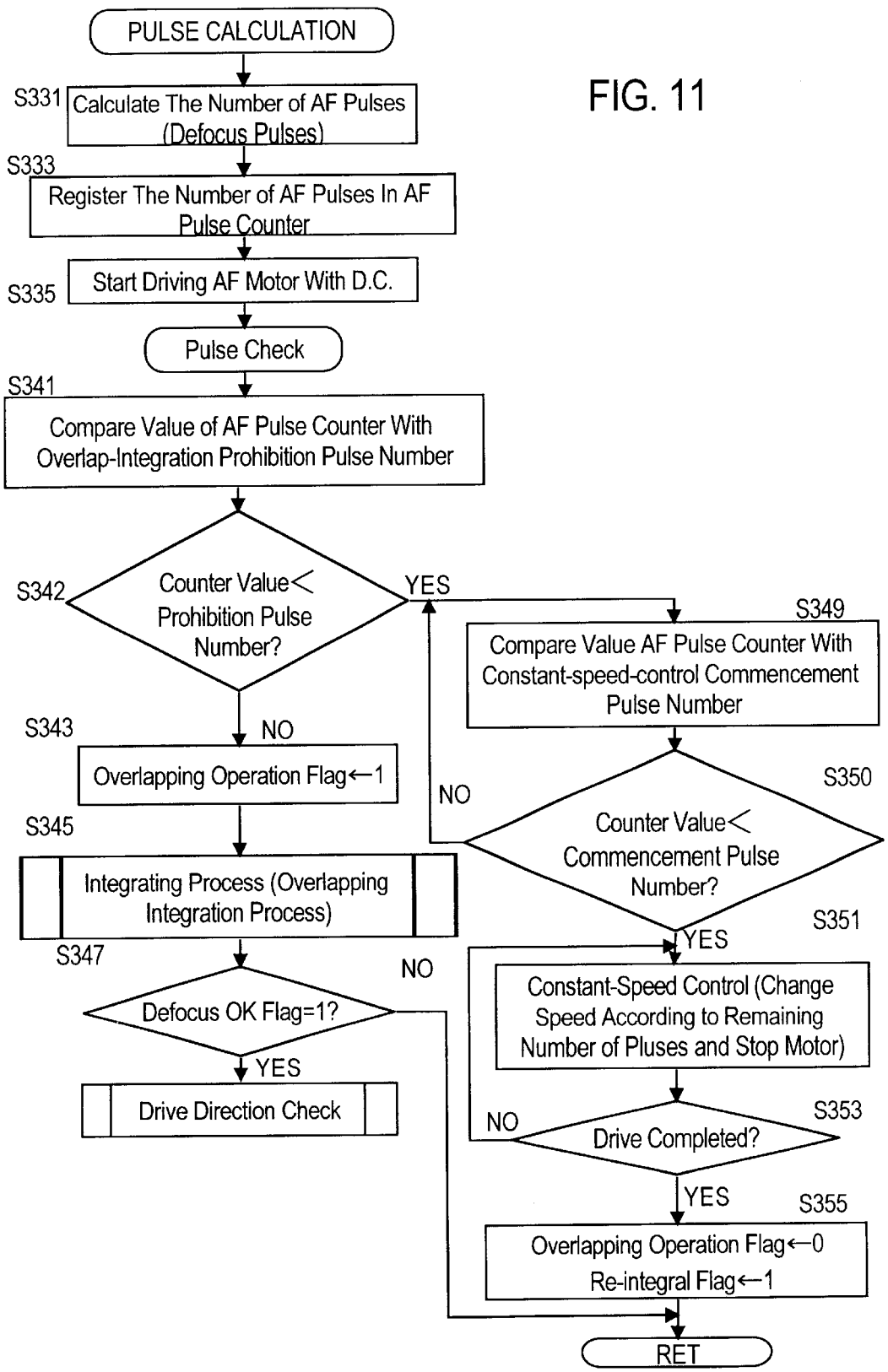
FIG. 11 is a flow chart showing another part of the main process (PULSE CALCULATION) that is performed in the automatic level shown in FIG. 1.
Figure 12:
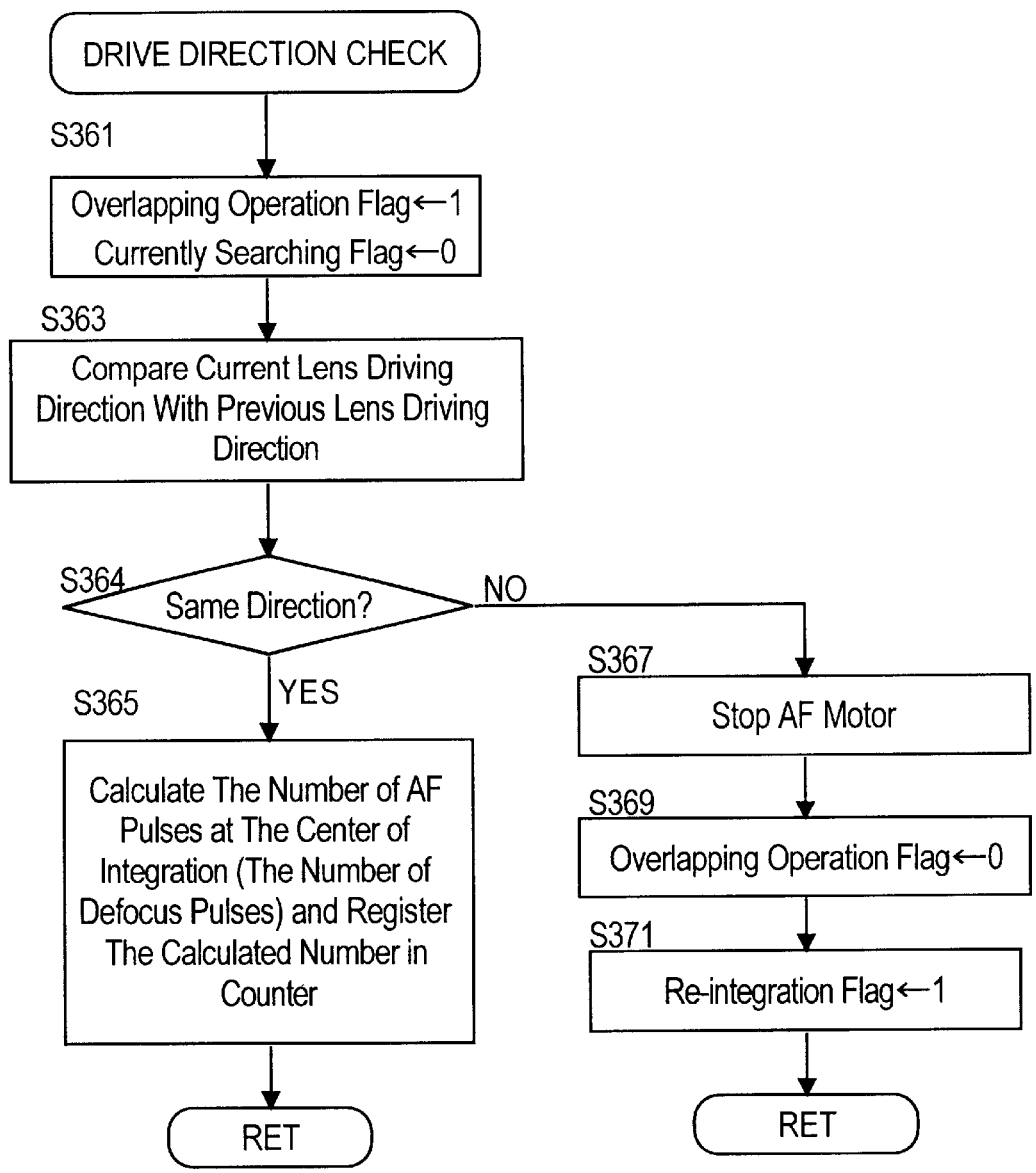
FIG. 12 is a flow chart showing another part of the main process (DRIVE-DIRECTION CHECK) that is performed in the automatic level shown in FIG. 1.

If the calculated amount of defocus is not valid or the correlation function f(n) having only one minimum value cannot be obtained, the processing/control circuit 23 inputs the A-sensor data and the B-sensor data while moving the focusing lens group 12 so that a valid amount of defocus can be obtained, and a defocus amount calculating process is performed ("Search-Integrating Process" shown in FIG. 10). At this time, the processing/control circuit 23 performs the correlation operation not for the whole range of the phase difference detectable range X but for that limited range of the phase difference detectable range X which is determined in accordance with the amount of movement of the focusing lens group and the moving direction thereof (see FIGS. 5(1) through 5(4), FIG. 6B and FIGS. 7A and 7B). The number of pixels of each of the A-sensor and the B-sensor (i.e., the number of pixel data) which are actually used in the correlation operation is constant (fourteen in the present embodiment), while the maximum data shifting amount |±N| is varied by changing the phase difference detection range x. In each of FIGS. 6A, 6B, 7A and 7B, the phase difference detection range x is indicated as a "Shifting Range" shifting of the sensor data for the purpose of illustration.

In the auto-focusing process of a surveying instrument designed to be focused on a stationary object, rather than a moving object, it is assumed that the sighting object never moves immediately after the auto-focusing process starts, so that it is not necessary to perform the correlation operation for that portion (overlapping portion) of the phase difference detectable range X for the current position of the focusing lens group 12 after it is driven for focusing, which overlaps the previous phase difference detectable range X. For instance, in the auto-focusing process, if the focusing lens group 12 is driven toward the close-up extremity (e.g., from the position d0 shown in FIG. 5(1) to the position $d_1$ shown in FIG. 5(2)) for focusing, the correlation operation has been already performed for a major portion of the current phase difference detectable range X on the infinite distance side, so that the focusing process does not have to be performed again for that portion. Considering this fact, the correlation operation only need to be performed for that limited portion (i.e., the phase difference detection range x) of the phase difference detectable range X for the current position of the focusing lens group 12 which does not overlap the previous phase difference detectable range X. This reduces the number of times (the maximum data shifting amount |±N|) of performing the correlation operation to thereby reduce the time taken to perform the correlation operation.

In the present embodiment, for the purpose of obtaining a fairly reliable result in the correlation operation, the correlation operation is performed not only for the aforementioned limited portion of the phase difference detectable range X, but also for another portion of the same which overlaps the previous phase difference detectable range X and whose degree of reliability in sensor data is considered low. Accordingly, the phase difference detection range $x_n$ ($x_1$, $x_2$ or $x_3$) shown in each of FIGS. 5(2), 5(3) and 5(4) overlaps the previous phase difference detectable range X by an amount n', wherein n' represents the minimum overlapping amount.

When the moving speed of the focusing lens group 12 is set constant, there occurs an undetectable range in the phase difference detectable range X in which a phase difference cannot be detected if the integral action time becomes long due to a low brightness of the sighting object. To prevent this problem from occurring, in the present embodiment, the integrating operation of the AF sensor 21 is controlled to stop, in order to perform the correlation operation before the focusing lens group 12 moves to an axial position thereof, at which the overlapping portion between the current phase difference detectable range X and the previous phase difference detectable range X becomes smaller than a half of the phase difference detectable range X.

In the present embodiment, when detecting a focal point, the focusing lens group 12 is firstly driven toward the close-up extremity, and if focus cannot be achieved, subsequently is driven back toward the infinite extremity immediately after the focusing lens group 12 reaches the close-up extremity. In the case shown in FIGS. 6A and 6B, if the focusing lens group 12 is driven toward the close-up extremity, the image formed on the B-sensor moves left as viewed in FIGS. 6A and 6B so that the space between the pair of images respectively formed on the A-sensor and the B-sensor becomes narrow. Conversely, if the focusing lens group 12 is driven toward the infinite extremity, the image formed on the B-sensor moves right (not shown) so that the space between the pair of images respectively formed on the A-sensor and the B-sensor becomes wide.

When the focusing lens group 12 is positioned at the position $d_n$ ($d_1$, $d_2$ or $d_3$ in the particular case shown in FIG. 5) after it is moved for focusing, the maximum data shifting amount |±N| and the correlation operation commencing position (the correlation operation commencing position of the B-sensor data which is made to be coincident with the reference pixel positions A[5] of the A-sensor data) are determined; and subsequently, the correlation operation is repeated while increasing and decreasing the data shifting amount n from zero (which corresponds to the correlation operation commencing position) in steps of one until the data shifting amount n reaches the maximum data shifting amount |±N|.

In this case, the maximum data shifting amount |±N| is set at ½ times of the sum of a data shifting amount converted from the amount of movement $\Delta x_n$ ($\Delta x_1$, $\Delta x_2$ or $\Delta x_3$ in the particular case shown in FIG. 5) of the focusing lens group 12 and the aforementioned minimum overlapping amount n'. Regarding the correlation operation commencing position of the B-sensor data, the determined maximum data shifting amount |±N| is subtracted from the data shifting amount M (M=5 in the present embodiment) to determine a difference therebetween, and the pixel position shifted from the reference pixel position B[5] by the determined difference in a direction corresponding to the moving direction of the focusing lens group 12 is set at the correlation operation commencing position of the B-sensor data. It should be noted that the correlation operation commencing position A[γ] of the A-sensor data is A[5] at all times in the present embodiment since the A-sensor data is not shifted relative to the B-sensor.

The minimum overlapping amount n' represents the minimum amount of the data shifting amount which overlaps the previous phase difference detectable range X so that the correlation operation is performed not only for the aforementioned limited portion of the phase difference detectable range X, but also for the overlapping portion. The minimum overlapping amount n' is determined in advance. In the present embodiment shown in FIGS. 5, 6A and 6B, the minimum overlapping amount n' is set at an amount corresponding to two pixels.

The lens position $d_1$ represents an axial position of the focusing lens group 12 shifted from the lens position do toward the close-up extremity (to the right as viewed in FIG. 5) by the amount of movement $\Delta x_1$. The amount of movement $\Delta x_1$ (see FIG. 5(2)) corresponds to one pixel if converted to the data shifting amount (phase difference). At this time, the maximum data shifting amount $|N_{1}|_{is}$ 1 (one pixel) determined by the following equation:

$$|N_1|=(1 \text{ pixel}+2 \text{ pixels})/2=1.5$$

wherein the fractional portion of the number is dropped.

Regarding the correlation operation commencing position, the determined maximum data shifting amount "1" is subtractedfrom the data shifting amount "5" to determine a difference therebetween (equal to 4), and the pixel position shifted from the reference pixel position B[5] by the determined difference in a direction corresponding to the moving direction of the focusing lens group 12 (to the right as viewed in FIG. 6B) is set at the correlation operation commencing position, so that the correlation operation commencing position is herein determined to be B[9]. In other words, since the focusing lens group 12 is moved toward the close-up extremity (to the right as viewed in FIG. 5), the shift direction is to the right, so that the calculation is positive (+), i.e., 5+(5−1)=9, and therefore the pixel position is shifted from reference pixel position B[5] to B[9].

Subsequently, on condition that a state where the B-sensor data is overlaid on the A-sensor data so that the pixel positions B[9] through B[22] of the B-sensor data respectively coincide with the pixel positions A[5] through A[18] of the A-sensor data is regarded as a state where the data shifting amount n is equal to zero (n=0), the correlation operation is repeated while the B-sensor data is mathematically overlaid on the A-sensor data with the B-sensor data being shifted relative to the A-sensor data by plus one (to the right by one pixel as viewed in FIG. 6B) until the data shifting amount n reaches the maximum data shifting amount 1, and minus one (to the left by one pixel as viewed in FIG. 6B) until the data shifting amount n reaches the maximum data shifting amount |−1. Namely, when the focusing lens group 12 is positioned at the position $d_1$, the pixels B[8] through B[23] of the B-sensor data are used, while the correlation operation is repeated three times in total for the phase difference detection range $x_1$.

If a valid amount of defocus cannot be obtained even when the focusing lens group 12 is positioned at the lens position $d_1$, the focusing lens group 12 is moved to the lens position $d_2$. The amount of movement $\Delta x_2$. (see FIG. 5(3)) corresponds to three pixels if converted to the data shifting amount (phase difference). At this time, the maximum data shifting amount $|N_2|$ is 2 (two pixels) determined by the following equation:

$$|N_2|=(3 \text{ pixel}+2 \text{ pixels})/2=2.5$$

wherein the fractional portion of the number is dropped.

Regarding the correlation operation commencing position, the determined maximum data shifting amount "2" is subtracted from the data shifting amount "5" to determine a difference therebetween (equal to 3), and the pixel position shifted from the reference pixel position B[5] by the determined difference in a direction corresponding to the moving direction of the focusing lens group 12 (to the right as viewed in FIG. 7B) is set at the correlation operation commencing position, so that the correlation operation commencing position is herein determined to be B[8].

Subsequently, on condition that a state where the B-sensor data is overlaid on the A-sensor data so that the pixel positions B[8] through B[21] of the B-sensor data respectively coincide with the pixel positions A[5] through A[18] of the A-sensor data is regarded as a state where the data shifting amount n is equal to zero (n=0), the correlation operation is repeated while the B-sensor data is mathematically overlaid on the A-sensor data with the B-sensor data being shifted relative to the A-sensor data by plus one until the data shifting amount n reaches the maximum data shifting amount $|2|$, and minus one until the data shifting amount n reaches the maximum data shifting amount $|-2|$. Namely, when the focusing lens group 12 is positioned at the position $d_2$, the pixels B[8] through B[23] of the B-sensor data is used, while the correlation operation is repeated five times in total for the phase difference detection range $x_2$.

If a valid amount of defocus cannot be obtained even when the focusing lens group 12 is positioned at the lens position $d_2$, the focusing lens group 12 is moved to the lens position $d_{32}$. The amount of movement $\Delta x_3$ (see FIG. 5(4)) corresponds to five pixels if converted to the data shifting amount (phase difference). At this time, the maximum data shifting amount $|N_3|$ is 3 (three pixels) determined by the following equation:

$$|N_3|=(5 \text{ pixels}+2 \text{ pixels})/2=3.5$$

wherein the fractional portion of the number is dropped.

Regarding the correlation operation commencing position, the determined maximum data shifting amount "3" is subtracted from the data shifting amount "5" to determine a difference therebetween (equal to 2), and the pixel position shifted from the reference pixel position B[5] by the determined difference in a direction corresponding to the moving direction of the focusing lens group 12 (to the right as viewed in FIG. 7A) is set at the correlation operation commencing position, so that the correlation operation commencing position is herein determined to be B[7].

Subsequently, on condition that a state where the B-sensor data is overlaid on the A-sensor data, so that the pixel positions B[5] through B[19] of the B-sensor data respectively coincide with the pixel positions A[5] through A[18] of the A-sensor data, is regarded as a state where the data shifting amount n is equal to zero (n=0), the correlation operation is repeated while the B-sensor data is mathematically overlaid on the A-sensor data with the B-sensor data being shifted relative to the A-sensor data by plus one until the data shifting amount n reaches the maximum data shifting amount $|3|$, and minus one until the data shifting amount n reaches the maximum data shifting amount $|-3|$. Namely, when the focusing lens group 12 is positioned at the position $d_3$, the pixels B[4] through B[23] of the B-sensor data are used, while the correlation operation is repeated seven times in total for the phase difference detection range $x_3$.

During the time a valid amount of defocus cannot be obtained, the focusing lens group 12 continues to be driven towards the close-up extremity while the aforementioned defocus amount calculating process is repeated. Thereafter, if the focusing lens group 12 reaches the close-up extremity with no valid amount of defocus obtained, the focusing lens group 12 is driven back toward the infinite extremity while the aforementioned defocus amount calculating process is repeated. Thereafter, if the focusing lens group 12 reaches the infinite extremity with no valid amount of defocus obtained, the processing/control circuit 23 ends the defocus amount calculating process.

Figure 7A:
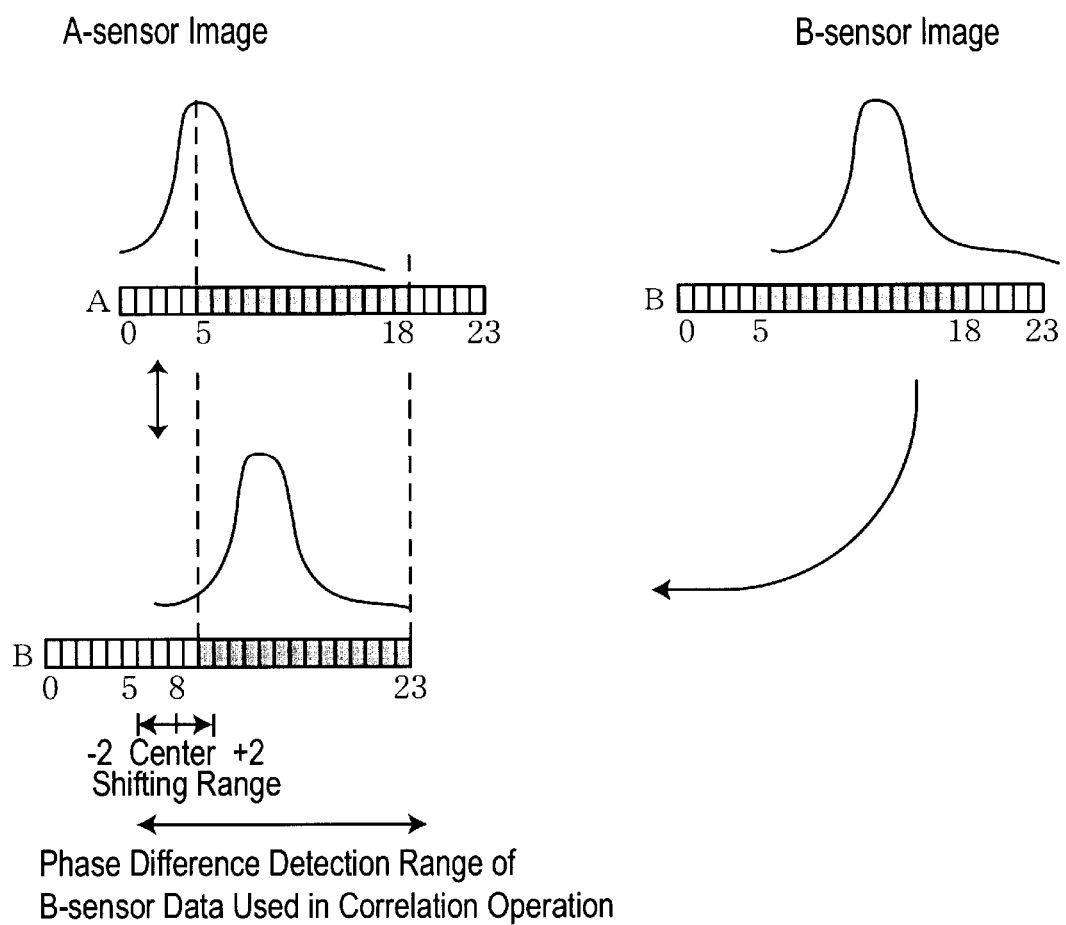
FIG. 7A is a diagram showing a relationship among two sets of AF sensor data respectively output from the AF sensor shown in FIG. 2 and the phase difference detection range.
Figure 7B:
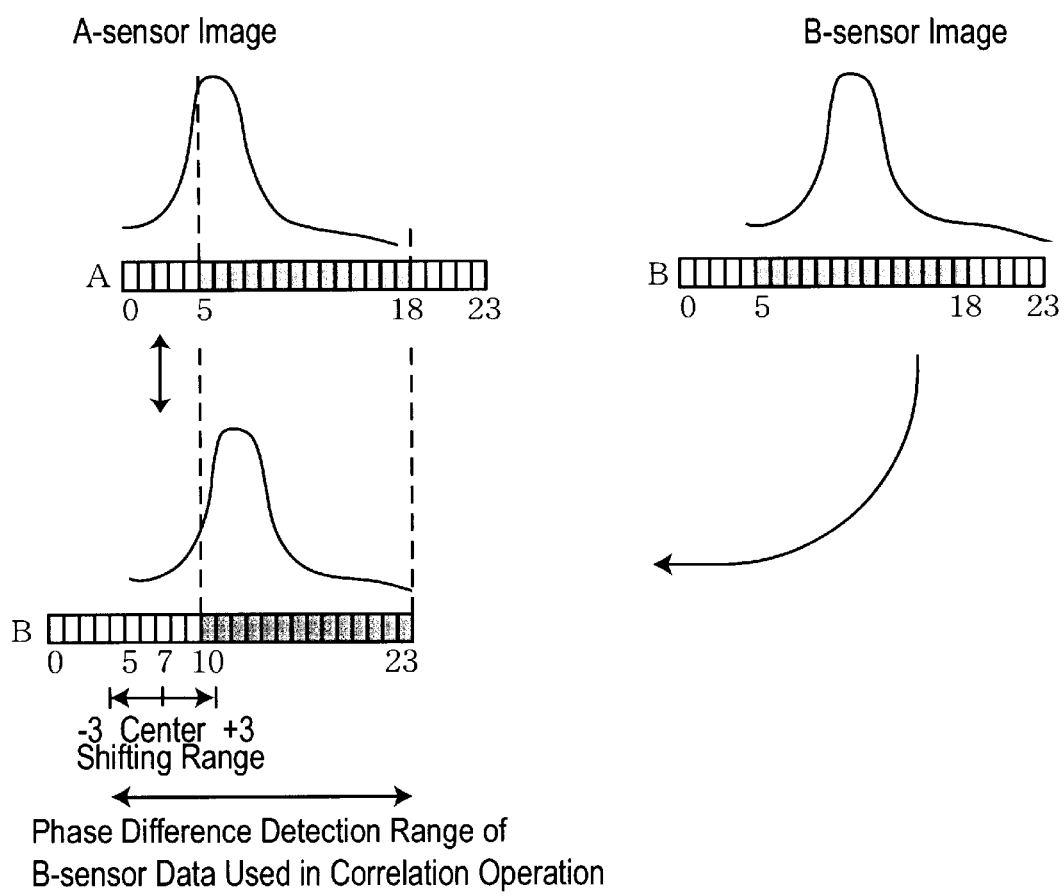
FIG. 7B is a diagram showing a relationship among two sets of AF sensor data respectively output from the AF sensor shown in FIG. 2 and the phase difference detection range.
Figure 8:
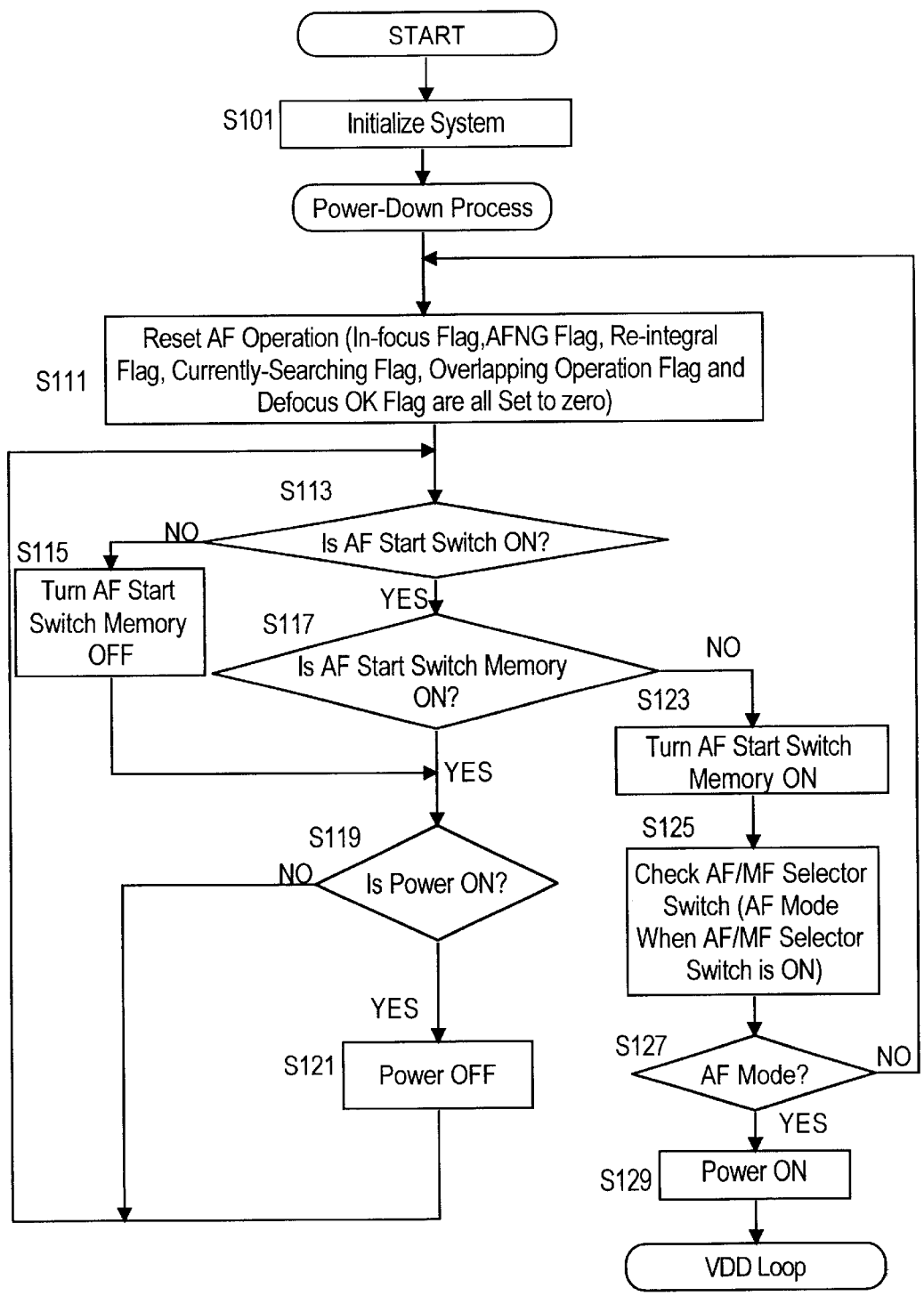
FIG. 8 is a flow chart showing part of the main process (START) that is performed in the automatic level shown in FIG. 1.
Figure 9:
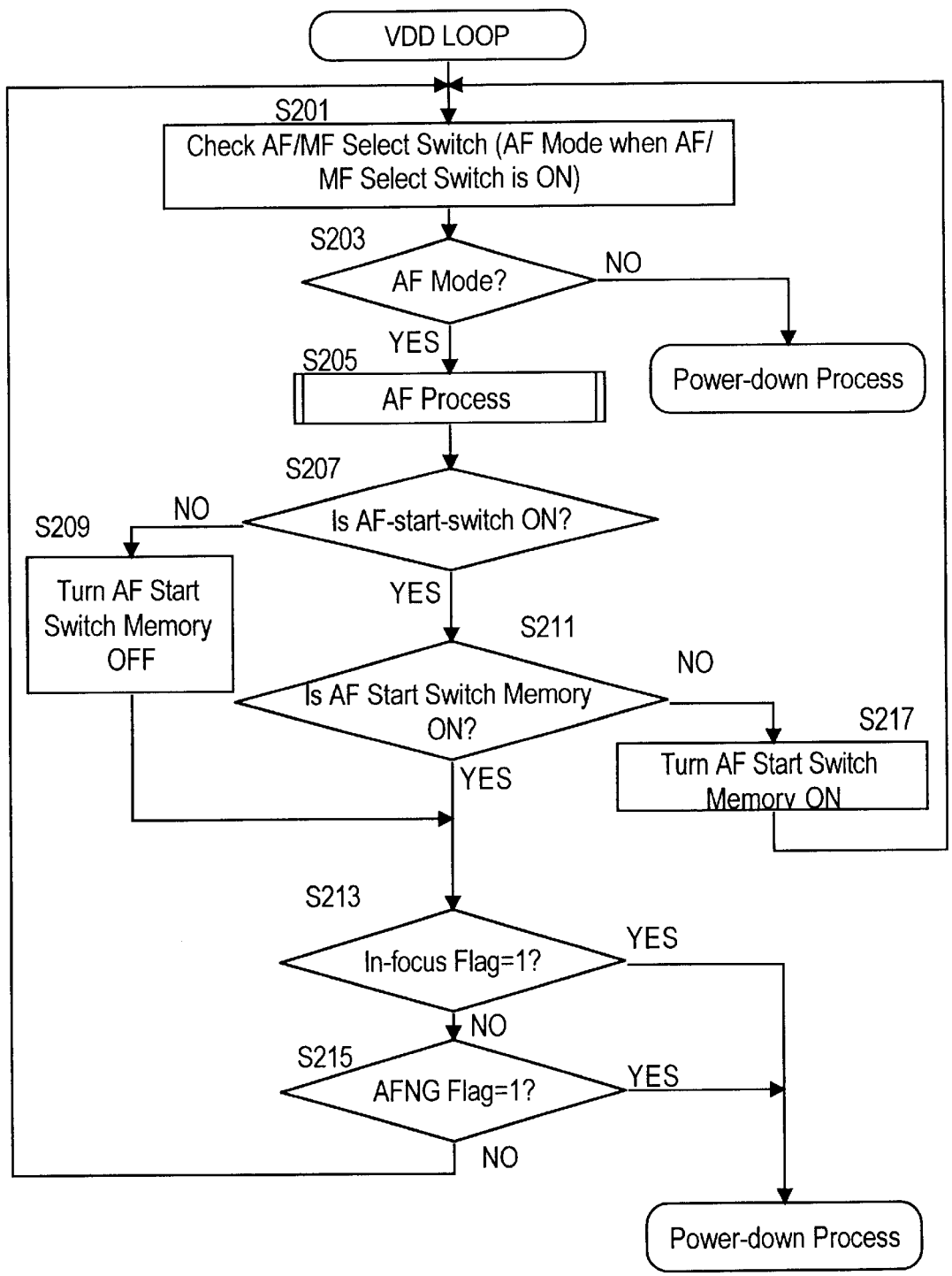
FIG. 9 is a flow chart showing another part of the main process (VDD LOOP) that is performed in the automatic level shown in FIG. 1.

In the particular case shown in FIG. 7B, the amount of defocus, which is calculated in accordance with the value "+3" of the data shifting amount n (n=+3) as phase difference that gives the minimum value to the correlation function f(n) derived from the correlation operation performed for the lens position $d_3$, is a valid amount of defocus; so that the processing/control circuit 23 moves the focusing lens group 12 by the amount of movement which is determined in accordance with the valid amount of defocus. Subsequently the processing/control circuit 23 ends the auto-focusing process immediately after the amount of defocus becomes zero.

An embodiment of the main process performed in the automatic level 10 will be hereafter discussed in detail with reference to FIGS. 8 through 14. The main process is performed by the processing/control circuit 23 in a state wherein a battery (not shown) for supplying power to the automatic level 10 is loaded in the automatic level 10.

In the present embodiment, upon the AF start switch 27 being turned ON, the auto-focusing process continues to be performed until it completes even if the start switch 27 is turned OFF soon after it is turned ON.

Immediately after the battery is loaded in the automatic level 10, the processing/control circuit 23 initializes an internal RAM (not shown) and each of input/output ports (not shown) at step S101, and subsequently performs a power down process. The operation at step S101 is not performed again unless the battery is taken out of the automatic level 10 and re-loaded therein.

The power down process is a "stand-by process" which waits for the AF start switch 27 to be turned ON with all the circuits except for the processing/control circuit 23 being turned OFF during the time the AF start switch 27 is OFF, and turns the power ON to perform the auto-focusing process (step S205) upon the AF start switch 27 being turned ON.

In the power down process, all the flags regarding the auto-focusing process are set to zero (step S111). The flags regarding the auto-focusing process include an in-focus flag indicating whether an in-focus state has been obtained, an autofocus NG flag (AFNG flag) indicating whether an in-focus state could not be obtained, a re-integral flag indicating whether the integrating process (FIG. 13) has been performed after an in-focus state has been obtained, a currently searching flag indicating whether the integrating process has been performed while the focusing lens group 12 continues to move because a valid amount of defocus could not be obtained, an overlapping operation flag indicating whether the integrating process has been performed while the focusing lens group 12 continues to move in accordance with a valid amount of defocus, and a defocus OK flag indicating whether a valid amount of defocus has been obtained.

After the operation at step S111 is completed, it is determined whether the AF start switch 27 is ON (step S113). Since the AF start switch 27 is OFF in an initial state wherein the AF start switch 27 has not been operated, an AF-start-switch memory (not shown) which is built into the processing/control circuit 23 is turned OFF; i.e., OFF-information is stored in the AF-start-switch memory (step S115). Thereafter it is determined whether the power is ON (step S119). Since the power is OFF in an initial state wherein the AF start switch 27 has not been operated, control returns to step S113, so that the operations S113, S115 and S119 are repeatedly performed until the AF start switch 27 is operated.

If it is determined at step S113 that the AF start switch 27 is turned ON, it is determined whether the AF-start-switch memory is ON, i.e., it is determined whether ON-information has been stored in the AF-start-switch memory (step S117). If the AF-start-switch memory is OFF (the AF-start-switch memory is OFF when control first enters the operation at step S117 after it is determined at step S113 that the AF start switch 27 is turned ON), the AF-start-switch memory is turned ON, i.e., ON-information is written into the AF-start-switch memory (step S123). Thereafter the state of the AF/MF selector switch 29 is checked, and thereafter it is determined whether the AF Mode has been selected (steps S125 and S127). If it is determined at step S127 that the AF Mode is currently selected), power is turned ON to be supplied to each circuit (step S129), and thereafter control proceeds to VDD loop process shown in FIG. 9. If it is determined at step S127 that the AF Mode is not currently selected (i.e., the MF Mode is currently selected), control returns to step S111.

In the VDD loop process ("VDD LOOP" shown in FIG. 9), the auto-focusing process (step S205) is performed while the state of the AF start switch 27 is checked regularly. In the VDD loop process, control returns to the power down process shown in FIG. 8 upon determining that an in-focus state is obtained, or that it is impossible to obtain an in-focus state.

In the VDD loop process, the state of the AF/MF selector switch 29 is again checked, and subsequently it is determined whether the AF Mode is selected (steps S201 and S203). Control enters the auto-focusing process at step S205 if AF Mode is selected. Control enters the power down process (step S111) if MF Mode is selected. The following discussion will be made on the assumption that the AF/MF selector switch 29 is ON (i.e., the AF Mode is selected).

If the AF/MF selector switch 29 is ON, the auto-focusing process is performed in which the amount of defocus is calculated to move the focusing lens group 11 to an in-focus position thereof (step S205). After the auto-focusing process at step S205, it is determined in the VDD loop process whether the AF start switch 27 is ON (step S207).

If it is determined at step S207 the AF start switch 27 is ON, it is determined whether the AF-start-switch memory is ON (step S211). If it is determined at step S211 that the AF-start-switch memory is not ON, the AF-start-switch memory is turned ON (step S217) and subsequently control returns to step S201. If it is determined at step S211 that the AF-start-switch memory is ON, control proceeds to step S213 at which it is determined whether the in-focus flag is 1. If it is determined at step S213 that the in-focus flag is 1, control proceeds to the power down process shown in FIG. 8. If it is determined at step S213 that the in-focus flag is not 1, control proceeds to step S215 at which it is determined whether the autofocus NG flag is 1. If it is determined at step S215 that the autofocus NG flag is 1, control proceeds to the power down process shown in FIG. 8. If it is determined at step S215 that the autofocus NG flag is not 1, control returns to step S201. If it is determined at step S207 the AF start switch 27 is not ON, the AF-start-switch memory is turned OFF (step S209) and subsequently control proceeds to step S213.

Since the AF start switch 27 generally remains ON when control first enters the operation at step S207, it is determined whether the AF-start-switch memory is ON (step S211). Subsequently, control proceeds from step S211 to step S213 since the AF-start-switch memory has been turned ON at step S123.

If it is impossible to determine either that an in-focus state has been obtained or that an in-focus state cannot be obtained in the auto-focusing process at step S205, the in-focus flag and the AFNG flag are zero, so that control returns to the process at step S201 (steps S213 and S215). Thereafter, the VDD loop process is repeated until it is determined that an in-focus state has been obtained or that an in-focus state cannot be obtained in the auto-focusing process to thereby set the auto-focusing NG flag (AFNG flag) to one.

In general, the focusing lens group 12 is moved to an in-focus position thereof by the auto-focusing process at step S205, so that the in-focus flag is set to 1 and therefore control returns to the power down process (step S213). If an in-focus state cannot be obtained due to reasons such as, for example, the sighting object is not still, the sighting object is too dark, and/or that the contrast of the sighting object is too low, the autofocus NG flag is set to 1 in the auto-focusing process at step S205, so that control proceeds from step S215 to the power down process.

When control returns to the power down process, the auto-focusing process ends at step S111. Subsequently, in the case where the AF start switch 27 is ON, control proceeds to step S121 via the operations at steps S113, S117 and S119 to turn the power OFF, and control repeats the operations at step S113, S117 and S119 until the AF start switch 27 is turned ON. In the case where the AF start switch 27 is OFF, control proceeds from step S113 to step S115 wherein OFF-information is written into the AF-start-switch memory, and subsequently the power is turned OFF (step S121). Thereafter control returns to step S113 to wait for the AF start switch 27 to be turned ON.

If control returns to the power down process from the VDD loop process, the power is turned OFF to cut off power supply to each circuit other than the processing/control circuit 23 regardless of the ON/OFF state of the AF start switch 27.

As can be understood from the foregoing, once the AF start switch 27 is turned ON, the auto-focusing process is repeated until it is determined that an in-focus state is obtained, or that it is impossible to obtain an in-focus state, so that the user can carry out a surveying operation without having to be concerned about the AF process.

The auto-focusing process at step S205 will be hereinafter discussed in detail with reference to the flow charts shown in FIGS. 10 through 14. In the auto-focusing process, it is determined whether each of the overlapping operation flag, the currently searching flag and the re-integral flag is zero (steps S301, S303 and S305). When control first enters the auto-focusing process, control proceeds to step S307 via steps S301, S303 and S305 to perform the integrating process ("INTEGRATING PROCESS" shown in FIG. 13) since the overlapping operation flag, the currently searching flag and the re-integral flag have been all initialized to zero at step S111. In the integrating process, the AF sensor 21 is controlled to start integrating (accumulating) electric charge and subsequently the result of the integrating operation is input to the processing/control circuit 23 as AF sensor data to perform the defocus amount calculating process. Although the details will be discussed later, in the defocus amount calculating process performed at step S307, a phase difference is determined in accordance with two sets of AF sensor data respectively input from the pair of line sensors 21b to calculate an amount of defocus and the direction thereof in accordance with the determined phase difference (see FIGS. 5, 6A, 6B, 7A, 7B and 14).

Subsequently, it is determined whether the defocus OK flag is 1, namely, whether a valid amount of defocus has been obtained (step S309). A valid amount of defocus cannot be obtained if an image of the sighting object is not formed within the phase difference detectable range X, if the contrast of the sighting object is too low, if the sighting object has a repeating pattern and/or the luminance of the sighting object is too low. Firstly, the auto-focusing process when a valid amount of defocus is obtained through the integrating process at step S307 will be hereinafter discussed.

[The case wherein a valid amount of defocus is obtained through the integrating process at step S307]

If it is determined at step S309 that the defocus OK flag is 1, control enters the focus-state checking process in which it is determined whether an in-focus state is obtained. The in-focus flag is set to 1 if an in-focus state is obtained, while the in-focus flag is set to zero if an in-focus state is not obtained (step S321). In the present embodiment, it is determined by the processing/control circuit 23 that an in-focus state is obtained when the amount of defocus is equal to or smaller than a predetermined amount of defocus. Control returns to the VDD loop process to perform the operations at and after step S207 if an in-focus state is obtained. Control proceeds to the pulse calculation process (FIG. 11) if an in-focus state is not obtained.

In the pulse calculation process, the amount of driving of the AF motor 31 (i.e., the number of pulses output from the encoder 33) that is necessary for moving the focusing lens group 12 to an axial position thereof at which the amount of defocus becomes zero, is calculated in accordance with a valid amount of defocus.

In the pulse calculation process, firstly the amount of driving of the AF motor 31 (the number of AF pulses) and the driving direction thereof are calculated and determined in accordance with the calculated amount of defocus (step S331). Subsequently, the number of AF pulses calculated in the operation at step S331 is registered in the AF pulse counter 23a (step S333), and the AF motor 31 is driven with direct current (step S335). Subsequently control enters the pulse check process. The value of the AF pulse counter 23a is decreased by 1 each time an AF pulse is output from the encoder 33.

In the pulse check process, the drive speed of the AF motor 31 is controlled in accordance with the value of the AF pulse counter 23a. More specifically, if the value of the AF pulse counter 23a is equal to or greater than a predetermined overlap-integration prohibition pulse number, the AF motor 31 is driven at a faster speed to move the focusing lens group 12 to an axial position thereof at which an in-focus state is obtained in a shorter period of time. Once the value of the AF pulse counter 23a becomes smaller than the predetermined overlap-integration prohibition pulse number, the AF motor 31 is driven at a slow speed with PWM (pulse width modulation) control so that the focusing lens group 12 does not overrun, and thereafter the AF motor 31 is stopped upon the value of the AF pulse counter 23a reaching zero.

In the pulse check process, the value of the AF pulse counter 23a is compared with the predetermined overlap-integration prohibition pulse number (step S341), and subsequently it is determined whether the value of the AF pulse counter 23a is smaller than the predetermined overlap-integration prohibition pulse number (step S342). If the value of the AF pulse counter 23a is equal to or greater than the predetermined overlap-integration prohibition pulse number, the overlapping operation flag is set to 1 (step S343). Subsequently, the overlap integrating process starts, so that the AF sensor data is input from the AF sensor 21 and the defocus amount calculating process is performed (step S345).

Thereafter, it is determined whether the defocus OK flag is 1; namely, whether a valid amount of defocus has been obtained (step S347). If the defocus OK flag is 1, control proceeds to drive-direction check process shown in FIG. 12. If the defocus OK flag is zero, control returns to the VDD loop process to perform the operation at step S207 and thereafter.

In the drive-direction check process (see FIG. 12), the number of AF pulses is calculated in accordance with the AF sensor data obtained by the integrating process (overlap integrating process) performed during the driving of the AF motor 31, and subsequently the calculated number of AF pulses is registered in the AF pulse counter 23a. However, the AF motor 31 is stopped if the direction of driving of the AF motor 31 changes. In the present embodiment, when stopping the AF motor, the processing/control circuit 23 short-circuits both terminals of the AF motor 31 to stop the rotation thereof.

In the drive-direction check process, the overlapping operation flag is set to 1 while the currently-searching flag is set to zero (step S361). Subsequently, the current direction of driving of the AF motor 31 is compared with the previous direction of driving of the AF motor 31 in accordance with the result of the defocus amount calculating process (step S363). Subsequently, it is determined whether the current direction of driving of the AF motor 31 is the same as the previous one (step S364). If the current direction of driving of the AF motor 31 is the same as the previous direction, the number of AF pulses at the center of integration is calculated and registered in the AF pulse counter 23a (step S365), and control returns. If the current direction of driving of the AF motor 31 changes, the AF motor 31 is braked to stop the rotation thereof (step S367), the overlapping operation flag is set to zero (step S369) and the re-integral flag is set to 1 (step S371). Thereafter control returns to the VDD loop process.

Upon returning to the VDD loop process, control re-enters the AF process at step S205 after performing the operation at step S207 and operations thereafter. During the time the direction of driving of the AF motor 31 does not change, the overlapping operation flag remains at 1, so that control enters the pulse check process from step S301. Thereafter, control continues returning to the pulse check process until the value of the AF pulse counter 23a becomes smaller than the predetermined overlap-integration prohibition pulse number via the operations at steps S341, S342, S343, S345, S347, S361, S363, S364 and S365.

If it is determined at step S342 that the value of the AF pulse counter 23a (i.e., the number of AF pulses necessary for moving the focusing lens group 12 to an in-focus position thereof) is smaller than the predetermined overlap-integration prohibition pulse number, control proceeds to step S349 at which the value of the AF pulse counter 23a (the number of AF pulses) is compared with the predetermined constant-speed-control commencement pulse number; and it is determined whether the value of the AF pulse counter 23a is smaller than the predetermined constant-speed-control commencement pulse number (step S350). If the value of the AF pulse counter 23a is greater than or equal to the predetermined constant-speed-control commencement pulse number, control returns to step S349. Namely, due to the operations at steps S349 and S350, control waits for the number of AF pulses to be smaller than the predetermined constant-speed-control commencement pulse number. Subsequently, if it is determined at step S350 that the value of the AF pulse counter 23a is smaller than the predetermined constant-speed-control commencement pulse number, the AF motor 31 is driven at a slow speed with PWM control in accordance with the remaining number of AF pulses, and the AF motor 31 is stopped upon the value of the AF pulse counter 23a becoming zero (steps S351 and S353). Subsequently, immediately after the AF motor 31 stops, the overlapping operation flag is set to zero, and at the same time, the re-integral flag is set to 1 (step S355). Thereafter control returns to the VDD loop process.

If control enters the auto-focusing process at step S205 after returning to the VDD loop process, the overlapping operation flag is zero while the re-integral flag is 1, so that control enters the re-integration process from step S307. Control also enters the re-integration process from step S307 in the case where it is determined at step S364 that the current direction of driving of the AF motor 31 changes from the previous direction.

In the re-integration process, an amount of defocus is calculated to determine whether an in-focus state has been obtained. If an in-focus state has been obtained, the in-focus flag is set to 1 and subsequently control returns to the power down process to end the main process. If an in-focus state has not been obtained, the in-focus flag is set to zero to re-calculate the number of AF pulses to move the focusing lens group 12.

In the re-integration process, firstly the re-integral flag is set to 1 (step S381) and then the integrating process (FIG. 13) in which the AF sensor 21 is controlled to start integrating (accumulating) electric charge, and the result of the integrating operation is input to the processing/control circuit 23 as AF sensor data to perform the defocus amount calculating process is performed again (step S383). Subsequently, it is determined whether the defocus OK flag is 1, namely, whether a valid amount of defocus has been obtained (step S385).

If it is determined at step S385 that the defocus OK flag is 1, control enters the focus-state checking process which starts from the operation step S321 at which it is determined whether an in-focus state has been obtained in accordance with the calculated amount of defocus. At step S321, the in-focus flag is set to 1 if an in-focus state has been obtained, while the in-focus flag is set to zero if an in-focus state has not been obtained. Subsequently, it is determined whether the in-focus flag is 1, namely, whether an in-focus has been obtained (step 323). If it is determined at step S323 that the in-focus flag is 1, control returns to the power down process to end the auto-focusing process and wait for the AF start switch 27 to be operated. If it is determined at step S323 that the in-focus flag is not 1, control proceeds to the pulse calculation process shown in FIG. 11 to re-calculate the number of AF pulses to move the focusing lens group 12.

If it is determined at step S385 that the defocus OK flag is not 1, control enters the AFNG process in which the AFNG flag is set to 1 (step S391), and control returns to the VDD loop process, so that control proceeds from the operation at step S215 to the power down process to end the auto-focusing process.

[The case wherein a valid amount of defocus cannot be obtained through integrating process at step S307]

Secondly, the auto-focusing process when it is difficult or impossible to bring the sighting object into focus will be hereinafter discussed. If it is determined at step S307 that the defocus OK flag is zero (namely, a valid amount of defocus could not be obtained), control enters the search-integrating process.

In the search-integrating process, the defocus amount calculating process and the integrating process are performed while the AF motor 31 is driven, so as to obtain a valid amount of defocus. Although the details will be discussed later, in the defocus amount calculating process performed in the search-integrating process, the phase difference detection range x in which the correlation operation is actually performed is determined in accordance with the amount of movement of the focusing lens group 12 and the moving direction thereof. If a valid amount of defocus cannot be obtained through the search-integrating process, the AFNG flag is set to 1 and control returns to the power down process to end the auto-focusing process.

In the search-integrating process, firstly an AF-motor driving operation (search-driving operation) starts (step S311). In the AF-motor driving operation, the AF motor 31 is driven in order to search an in-focus point, initially in the direction of bringing an object of a near distance into focus (step S311). Subsequently, the currently searching flag is set to 1 (step S313). Subsequently, the AF sensor 21 is controlled to start integrating (accumulating) electric charge, and the results of the integrating operation are input to the processing/control circuit 23 as AF sensor data to perform the defocus amount calculating process (step S315). Although the details will be discussed later, the correlation operation is performed for the determined phase difference detection range x in accordance with the amount of movement of the focusing lens group 12 and the moving direction thereof to determine a phase difference, and an amount of defocus is calculated in accordance with the determined phase difference.

Subsequently, it is determined whether the defocus OK flag is 1, namely, whether a valid amount of defocus has been obtained (step S317). If the defocus OK flag is 1, control enters the drive-direction check process. If the defocus OK flag is not 1, it is determined whether a search-driving operation has completed (step S319). If the search-driving operation has not yet completed, control returns to the VDD loop process. If the search-driving operation has completed, control enters the AFNG process in which the AFNG flag is set to 1 (step S391), and control returns to the VDD loop process.

In the AF-motor driving operation (search-driving operation) at step S311, firstly the AF motor 31 is driven to search an in-focus point in the direction of bringing an object of a near distance into focus as noted above, and secondly, the AF motor 31 is driven reverse to search the same immediately after the focusing lens group 12 reaches the closest distance extremity thereof and stops. Thirdly, the AF motor 31 is stopped immediately after the focusing lens group 12 reaches the infinity distance extremity thereof. Once a valid amount of defocus is obtained during the search-driving operation, control returns to the operation in which the AF motor 31 is driven in accordance with the obtained amount of defocus.

If control again enters the AF process at step S205 after returning to the VDD loop process, the overlapping operation flag is zero while the currently-searching flag is 1, so that control enters the search-integrating process via the operation at step S303 to perform the search-driving operation at step S311 and operations thereafter. If a valid amount of defocus cannot be obtained even if the focusing lens group 12 reaches the infinity distance extremity thereof, control enters the AFNG process in which the AFNG flag is set to 1 (S311, S313, S315, S317; S319: Yes), and subsequently control returns to the VDD loop process. Thereafter, control proceeds from the operation at step S215 to the power down process.

However, the following process can be alternatively performed if a valid amount of defocus cannot be obtained even if the focusing lens group 12 reaches the infinity distance extremity thereof (S319: Yes). Namely, the phase difference detection range x is set to correspond to the phase difference detectable range x (i.e., the maximum data shifting amount |+N| is set at |+5|), similar to the case at the time of the commencement of detection of a focus point; and subsequently, on condition that a state where the B-sensor data is overlaid on the A-sensor data, so that the pixel positions B[5] through B[18] of the B-sensor data respectively coincide with the pixel positions A[5] through A[18] of the A-sensor data is regarded as a state where the data shifting amount n is equal to zero (n=0), the correlation operation is repeated while the B-sensor data is mathematically overlaid on the A-sensor data with the B-sensor data being shifted relative to the A-sensor data by plus one until the data shifting amount n reaches the maximum data shifting amount |5|, and thereafter the B-sensor data is shifted relative to the A-sensor data (from n=0) by minus one until the data shifting amount n reaches the maximum data shifting amount |−5| from zero.

Although the above illustrated process is directed to the case wherein a valid amount of defocus cannot be obtained from the start, if a valid amount of defocus can be obtained once, but an in-focus state cannot be obtained, and subsequently a valid amount of defocus cannot be obtained in the re-integration process even after the focusing lens group is driven, control proceeds from step S385 to the AFNG process in which the AFNG flag is set to 1, and control returns to the VDD loop process. Thereafter control proceeds from step S215 to the power down process.

Figure 13:
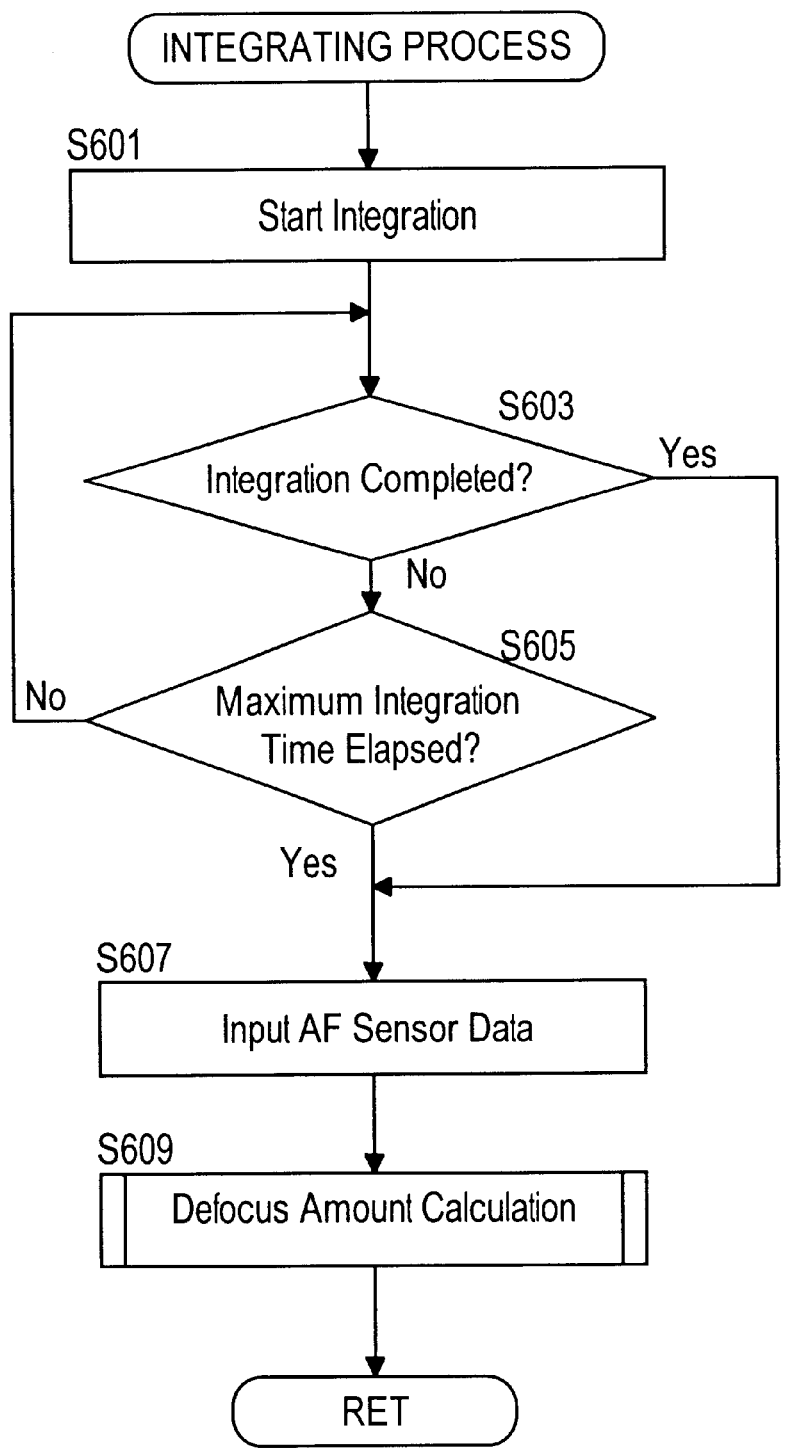
FIG. 13 is a flow chart showing another part of the main process (INTEGRATING PROCESS) that is performed in the automatic level shown in FIG. 1.
Figure 14:
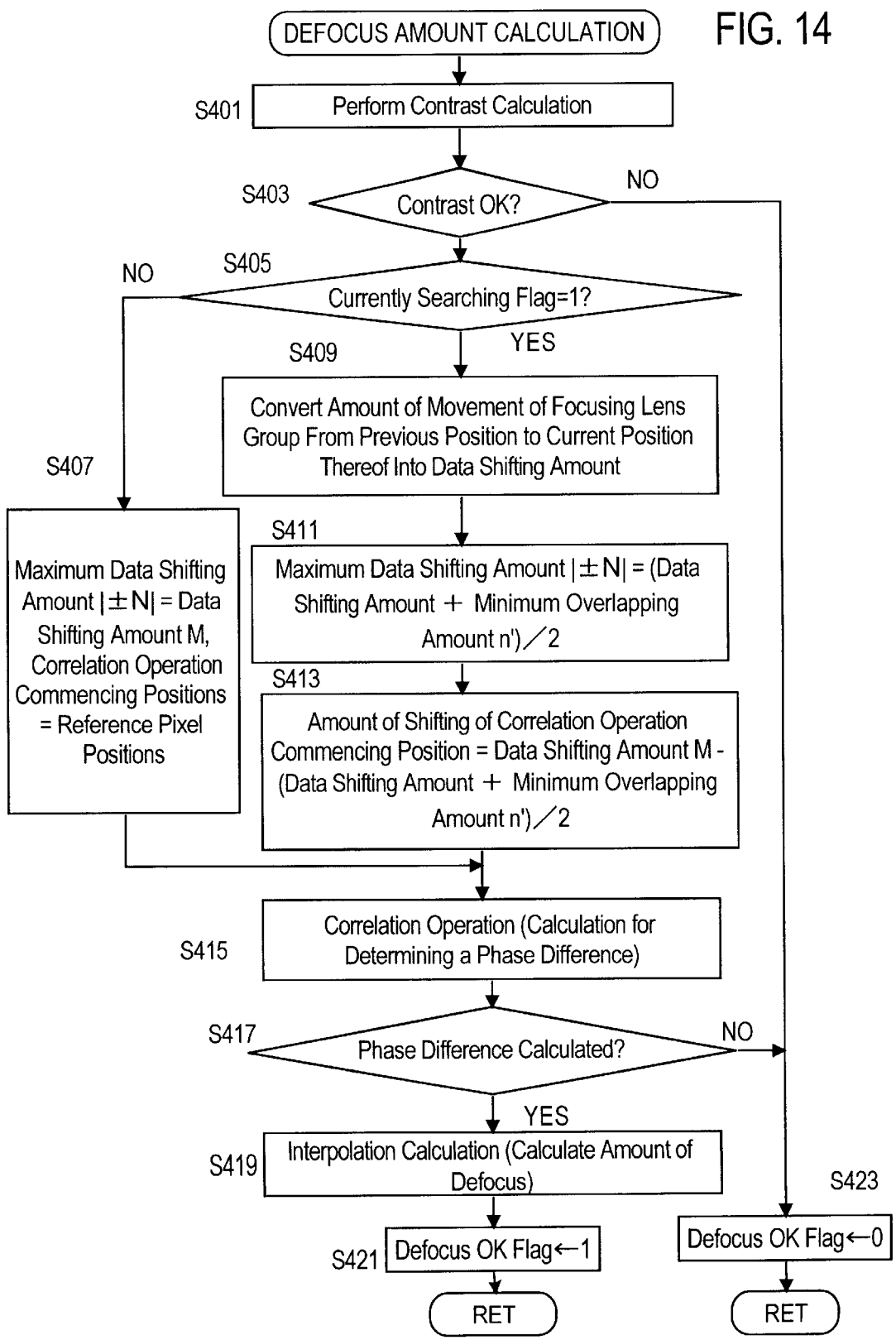
FIG. 14 is a flow chart showing another part of the main process (DEFOCUS AMOUNT CALCULATION) that is performed in the automatic level shown in FIG. 1.

The integrating operation performed at step S307, S315, S345 and S383 will be hereinafter discussed with reference to FIGS. 13 and 14. In the integrating operation, firstly, the AF sensor 21 is controlled to start integrating (accumulating) electric charge (step S601). Subsequently, it is determined whether the output of the aforementioned monitoring sensor (not shown), that is positioned adjacent to the pair of line sensors 21b, has reached a predetermined integration completion value (step S603). Control proceeds to step S607 if the output of the monitoring sensor has reached the predetermined integration completion value. If the output of the monitoring sensor has not yet reached the predetermined integration completion value, it is determined whether a predetermined maximum time of integration has elapsed (step S605). If the predetermined maximum time of integration has elapsed, the AF sensor 21 is controlled to stop integrating (accumulating) electric charge and then control proceeds to step S607. Control returns to step S603 if the predetermined maximum time of integration has not yet elapsed. Accordingly, through the operations at steps S603 and S605, the AF sensor 21 is controlled to stop integrating (accumulating) electric charge at the time the output of the monitoring sensor reaches the predetermined integration completion value or the predetermined maximum time of integration elapses. Thereafter the AF sensor data is input from the AF sensor 21 (step S607), and the defocus amount calculating process (FIG. 14) is performed (step S609). Thereafter control returns.

The defocus amount calculating process performed at step S609 will be hereinafter discussed in detail with reference to FIG. 14. In the defocus amount calculating process, the phase difference detection range x in which the correlation operation is actually performed is determined, the correlation operation is performed for the determined phase difference detection range x to determine a phase difference, and an amount of defocus is calculated in accordance with the determined phase difference.

In the defocus amount calculating process performed in the integrating process of the time control first enters the auto-focusing process upon the AF start switch 27 being turned ON (in a state where the focusing lens group 12 has not yet been moved for focusing), the correlation operation commencing positions of the A-sensor data and the B-sensor data are normally set at the reference pixel positions of the A-sensor data and the B-sensor data A[γ] and B [γ], respectively, while the maximum data shifting amount |±N| is set at the data shifting amount M, and thereafter, the correlation operation is performed. Namely, although the correlation operation is performed for the phase difference detectable range X, in the search-integrating process the correlation operation commencing positions of the A-sensor data and the B-sensor data and the maximum data shifting amount |+N| are varied in accordance with the amount of movement of the focusing lens group 12 and the moving direction thereof, and thereafter, the correlation operation is performed.

In the search-integrating process wherein the defocus amount calculating process and the integrating process are performed while the focus lens group 12 is moved, it is not necessary to perform the correlation operation for that portion (overlapping portion) of the phase difference detectable range X for the current position of the focusing lens group 12 after it is driven for focusing, which overlaps the previous phase difference detectable range X because the correlation operation has been already performed for the overlapping portion. Considering this fact, that portion of the phase difference detectable range X which does not overlap the previous phase difference detectable range X is determined as the phase difference detection range x, so that the correlation operation is performed for thephase difference detection range x. This reduces the number of times of performing the correlation operation to thereby reduce the time taken to perform the correlation operation.

In the present embodiment, for the purpose of obtaining a fairly reliable result in the correlation operation, the correlation operation is performed not only for the aforementioned overlapping portion of the phase difference detectable range X, but also for another portion of the same (which corresponds to the aforementioned minimum overlapping amount n') which overlaps the previous phase difference detectable range X and whose degree of reliability in sensor data is considered low.

In the defocus amount calculating process, firstly a contrast calculation is performed in accordance with the two sets of AF sensor data respectively output from the A-sensor and the B-sensor to determine the contrast of the sighting object (step S401). Subsequently, it is determined whether the determined contrast is greater than or equal to a predetermined value (step S403). If the determined contrast is smaller than the predetermined value, it is determined that there is no contrast, so that control proceeds to step S423 at which the defocus OK flag is set to zero and control returns. If the determined contrast is equal to or greater than the predetermined value, control proceeds to step S405 at which it is determined whether the currently searching flag is 1.

If it is determined at step S405 that the currently searching flag is not 1, the correlation operation commencing positions of the A-sensor data and the B-sensor data are set at the reference pixel positions of the A-sensor data and the B-sensor data A[γ] and B[γ] (A[5] and B[5] in this particular embodiment), respectively, while the maximum data shifting amount |±N| is set at the data shifting amount M (five in this particular embodiment) (step S407). Thereafter, the correlation operation is performed for the phase difference detectable range X (step S415). Accordingly, in the defocus amount calculating process performed at steps S307, S345, S383, the data shifting amount n of the time the B-sensor data is mathematically overlaid on the A-sensor data so that the pixel positions A[5] through B[18] of the A-sensor data respectively coincide with the pixel positions B[5] through B[18] of the B-sensor data is set at zero, while the correlation operation is repeated eleven times in total using the whole range of the phase difference detectable range X of the B-sensor by increasing the data shifting amount n from zero in steps of one until the data shifting amount n reaches the maximum data shifting maximum |5| and decreasing the data shifting amount n from zero in steps of one until the data shifting amount n reaches the maximum data shifting maximum |5|.

If it is determined at step S405 that the currently searching flag is 1, namely, that the current defocus amount calculating process is that performed in the search-integrating process at step S315, the phase difference detection range x is determined in accordance with the amount of movement of the focusing lens group 12 and the moving direction thereof (steps S409, S411 and S413). Firstly, the amount of movement of the focusing lens group 12 from the previous axial position thereof at which the defocus amount calculating process has been previously performed to the current position of the focusing lens group 12 is converted into the data shifting amount in pixels (step S409). Subsequently, the maximum data shifting amount |±N| is set at ½ times of the sum of a data shifting amount converted from the amount of movement $\Delta x_n$ of the focusing lens group 12 and the aforementioned minimum overlapping amount n' (step S411). Subsequently, the correlation operation commencing position is determined by subtracting the determined maximum data shifting amount |+N| from the data shifting amount M (step S413). Subsequently, the correlation operation is performed for the phase difference detectable range X, wherein the B-sensor data is shifted to the infinite distance side until the data shifting amount n reaches the maximum data shifting maximum |−N| and the close range side until the data shifting amount n reaches the maximum data shifting maximum |N| (step S415).

The maximum data shifting amount |±N| can be determined by the following equation:

|±N|=(the data shifting amount+the minimum overlapping amount n')/2, wherein the data shifting amount represents the data shifting amount converted from the amount of movement $\Delta x_n$ of the focusing lens group 12, and the minimum overlapping amount n' represents the minimum amount of the data shifting amount which overlaps the previous phase difference detectable range X so that the correlation operation is performed not only for the aforementioned limited portion of the phase difference detectable range X but also for the overlapping portion for the purpose of obtaining a reliable result in the correlation operation. In the present embodiment, the minimum overlapping amount n' is set at an amount corresponding to two pixels.

It should be noted that the correlation operation commencing position A[γ] of the A-sensor data is A[5] at all times in the present embodiment since the A-sensor data is not shifted relative to the B-sensor. The correlation operation commencing position B [γ] of the B-sensor data is determined to be a position shifted from the reference pixel position B[5] by an amount (amount of shifting of the correlation operation commencing position) SA calculated by the following equation:

SA=the data shifting amount M−(the data shifting amount+the minimum overlapping amount n')/2.

After the operation at step S415, it is determined whether a phase difference has been calculated (step S417). If a phase difference has been determined, it is determined that a valid phase difference has been determined by the correlation operation (calculation for determining a phase-difference), and control proceeds to the interpolation calculation operation at step S419 wherein an amount of defocus is calculated in accordance with the determined phase difference. Subsequently, the defocus OK flag is set to 1 (step S421), and control returns.

In the case of the defocus amount calculating process performed in the integrating process at step S307 or S383, if a valid phase difference (i.e., a phase difference which makes the correlation function f(n) have only one minimum value) has been determined, control comes out of the defocus amount calculating process to enter the focus-state checking process via step S309 or S385, respectively. In the case of the defocus amount calculating process performed in the integrating process at step S315 or S345, if a valid phase difference has been determined, control comes out of the defocus amount calculating process to enter the drive-direction check process from step S317 or S347, respectively.

If a valid phase difference cannot be determined in the defocus amount calculating process (i.e., it is determined at step S417 that a phase difference could not be calculated), control proceeds from step S417 to step S423 at which the defocus OK flag is set to zero and control returns. A phase difference cannot be determined in the defocus amount calculating process when the correlation function f(n) has no minimum value, or more than one minimum value.

In the case of the defocus amount calculating process performed in the integrating process at step S307, if a valid phase difference cannot be determined, control comes out of the defocus amount calculating process to enter the search-integrating process via step S309.

In the case of the defocus amount calculating process performed in the integrating process at step S315, if a valid phase difference cannot be determined, control comes out of the defocus amount calculating process to enter the AFNG process via step S319 if it is determined at step S319 that search-driving operation has completed (i.e., the focusing lens group 12 has reached the infinite extremity), or control comes out of the defocus amount calculating process to return to the VDD loop process via step S319 if it is determined at step S319 that search-driving operation has not yet completed (i.e., the focusing lens group 12 has not yet reached the infinite extremity).

In the case of the defocus amount calculating process performed in the integrating process at step S345, if a valid phase difference cannot be determined, control comes out of the defocus amount calculating process to return to the VDD loop process via step S347.

In the case of the defocus amount calculating process performed in the integrating process at step S383, if a valid phase difference cannot be determined, control comes out of the defocus amount calculating process to enter the AFNG process via step S385, the AFNG flag is set to 1 (step S391), and subsequently control returns to the VDD loop process, so that control proceeds from the operation at step S215 to the power down process to end the auto-focusing process.

In the above illustrated embodiment, although the phase difference detection range x, for which the correlation operation is performed, is changed only in the search integrating process, the present invention is not limited solely to this particular embodiment. For instance, in the case where the correlation operation is performed while the focusing lens group 12 is moved, the phase difference detection range x can be changed in accordance with the amount of movement of the focusing lens group 12 and the moving direction thereof. The phase difference detection range x can also be changed even in the overlap integrating process.

In the above illustrated embodiment, for the purpose of simplifying the explanation, only an embodiment wherein the B-sensor data is shifted relative to the A-sensor data regarded as a reference sensor data is disclosed. However, the present invention is not limited solely to this particular embodiment. For instance, another embodiment wherein the A-sensor data and the B-sensor data are shifted relative to each other is possible. Yet another embodiment wherein the A-sensor data and the B-sensor data are alternately shifted relative to each other is also possible.

In the above illustrated embodiment, the present invention is applied to an automatic level. However, the present invention can be applied to not only an automatic level, but also any other surveying apparatus such as a transit, a theodolite and a total station. Furthermore, the present invention can also be applied to any telescopic optical system such as a telescope and a binocular telescope.

As can be understood from the foregoing, according to the auto-focusing apparatus to which the present invention is applied, since the auto-focusing apparatus is provided with a controller which limits the phase difference detection range x in accordance with the amount of movement of the focusing lens group 12 and the moving direction thereof while the driving device drives the focusing lens group 12 for focusing, the number of times of performing the correlation operation is reduced, so that the time taken to perform the correlation operation is reduced.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. An auto-focusing apparatus comprising:
   a light receiving device comprising array of photoelectric conversion elements, said light receiving device separating an image of an object formed via an optical system into two separate images to re-form said two separate images on said array of photoelectric conversion elements so as to output two sets of image data, said optical system including a focusing optical system;
   a driving device which drives said focusing optical system along an optical axis thereof;
   an operation device which performs a predetermined operation for determining a phase difference between said two separate images while shifting at least part of one of said two sets of image data relative to the other of said two sets of image data; and
   a controller which limits a range of shifting of said at least part of one of said two sets of image data relative to said other of said two sets of image data in accordance with an amount of movement of said focusing optical system and a moving direction thereof, when said operation device performs said predetermined operation in accordance with said two sets of image data output from said light receiving device while said driving device drives said focusing optical system along said optical axis.

2. The auto-focusing apparatus according to claim 1, wherein said controller which does not limit said range when said operation device performs said predetermined operation in accordance with said two sets of image data output from said light receiving device while said driving device does not drive said focusing optical system along said optical axis.

3. The auto-focusing apparatus according to claim 1, wherein, with reference to a relative position between said two sets of image data at which said two sets of image data for said two separate images are in phase with each other when said optical system is focused on said object, said operation device performs said predetermined operation to determine said phase difference while shifting said at least part of one of said two sets of image data relative to said other of said two sets of image data in a first direction capable of determining a phase difference between said two separate images, which correspond to said two separate images, of an object positioned nearer than said in-focus object, and in a second direction capable of determining a phase difference between two separate images, which correspond to said two separate images, of an object positioned farther than said in-focus object.

4. The auto-focusing apparatus according to claim 3, wherein said operation device performs said predetermined operation to determine said phase difference while shifting said at least part of one of said two sets of image data relative to said other of said two sets of image data in steps of one pixel.

5. The auto-focusing apparatus according to claim 1, wherein said operation device performs said predetermined operation to determine said phase difference while shifting said at least part of one of said two sets of image data relative to said other of said two sets of image data, with said other of said two sets of image data being stationary, in a first direction capable of determining a phase difference between two separate images, which correspond to said two separate images, of an object at a near distance, and in a second direction capable of determining a phase difference between two separate images, which correspond to said two separate images, of an object at a far distance.

6. The auto-focusing apparatus according to claim 5, wherein said operation device performs said predetermined operation to determine said phase difference while shifting said at least part of one of said two sets of image data relative to said other of said two sets of image data in steps of one pixel.

7. The auto-focusing apparatus according to claim 6, wherein, when said operation device performs said predetermined operation to determine said phase difference while shifting said at least part of one of said two sets of image data relative to said other of said two sets of image data in one of said first direction and said second direction, said operation device limits a first secondary range in said range of shifting of said at least part of one of said two sets of image data relative to said other of said two sets of image data, wherein a phase difference between two separate images, which correspond to said two separate images, of said object at a far distance can be detected in said first secondary range in accordance with an amount of movement of said focusing optical system when said driving device drives said focusing optical system along said optical axis in a direction of bringing said object at a near distance into focus, said operation device limits a second secondary range in said range of shifting of said at least part of one of said two sets of image data relative to said other of said two sets of image data, wherein a phase difference between two separate images, which correspond to said two separate images, of said near distance object can be detected in said second secondary range in accordance with an amount of movement of said focusing optical system when said driving device drives said focusing optical system along said optical axis in a direction of bringing said far distance object into focus, and said operation device performs said predetermined operation to determine said phase difference between said two separate images while shifting said at least part of one of said two sets of image data relative to said other of said two sets of image data within one of said first secondary range and said second secondary range that is not limited by said operation device.

8. The auto-focusing apparatus according to claim 7, wherein said operation device performs an operation for calculating the difference between two image data of two adjacent pixels on every pair of two adjacent pixels of each of said two sets of image data and further calculates the sum of the absolute values of said calculated differences while shifting said at least part of one of said two sets of image data relative to said other of said two sets of image data in pixels, wherein said operation device performs a correlation operation in accordance with said calculated said sum of said absolute values to determine said phase difference, and wherein said operation device determines said amount of movement of said focusing optical system and said moving direction thereof in accordance with said determined phase difference.

9. The auto-focusing apparatus according to claim 8, wherein said shifting range limited by said controller corresponds to a part of an overlapping portion between a first said shifting range before said focusing lens group is driven by said driving device, and a second said shifting range after said focusing lens group is driven by said driving device.

10. The auto-focusing apparatus according to claim 9, wherein said shifting range limited by said controller corresponds to at least part of said overlapping portion, and wherein a degree of reliability of said phase difference determined by said operation device before said focusing optical system is driven by said driving device is considered high in said at least part of said overlapping portion.

11. The auto-focusing apparatus according to claim 8, wherein said shifting range limited by said controller corresponds to an overlapping portion between a first said shifting range before said focusing lens group is driven by said driving device, and a second said shifting range after said focusing lens group is driven by said driving device.

12. The auto-focusing apparatus according to claim 11, wherein said shifting range limited by said controller corresponds to at least part of said overlapping portion, and wherein a degree of reliability of said phase difference determined by said operation device before said focusing optical system is driven by said driving device is considered high in said at least part of said overlapping portion.

13. The auto-focusing apparatus according to claim 1, wherein said auto-focusing apparatus is incorporated in a surveying instrument.

14. A surveying instrument comprising:

a telescopic optical system having a main optical path and a split optical path which branches off from said main optical path, said telescopic optical system comprising a focusing lens group guided along an optical axis thereof;

a focus detector having a passive AF sensor positioned so that light traveling from said main optical path to said split optical path is incident on said focus detector, said passive AF sensor comprising at least one array of photoelectric conversion elements, said focus detector separating an image of an object formed via said telescopic optical system into two separate images to re-form said two separate images on said at least one array of photoelectric conversion elements so as to output two sets of image data;

a driving device which drives said focusing lens group along said optical axis for focusing;

an operation device which performs a predetermined operation for determining a phase difference between said two separate images while shifting at least part of one of said two sets of image data relative to the other of said two sets of image data; and a controller which limits a range of shifting of said at least part of one of said two sets of image data relative to said other of said two sets of image data in accordance with an amount of movement of said focusing lens group and a moving direction thereof when said operation device performs said predetermined operation in accordance with said two sets of image data output from said focus detector while said driving device drives said focusing lens group system along said optical axis.

15. An auto-focusing apparatus comprising:

a light receiving device comprising at least one array of photoelectric conversion elements and separating an image of an object formed via an optical system into two separate images to re-form said two separate images on said at least one array of photoelectric conversion elements so as to output two sets of image data, said optical system comprising a focusing optical system;

a driving device which drives said focusing optical system along an optical axis thereof;

a detecting device which detects a phase difference between said two separate images re-formed on said array of photoelectric conversion elements by said two sets of image data; and a controller which limits a area of said array of photoelectric conversion elements to detect said phase difference in accordance with an amount of movement of said focusing optical system and a moving direction thereof when said detection device performs said detection operation in accordance with said two sets of image data output from said array of photoelectric conversion elements while said driving device drives said focusing optical system along said optical axis.

16. The auto-focusing apparatus according to claim 15, wherein said controller which does not change said area of said array of photoelectric elements when said detecting device performs said operation in accordance with said two sets of image data output from said light receiving device while said driving device does not drive said focusing optical system along said optical axis.

17. The auto-focusing apparatus according to claim 15, wherein said controller changes said area of said array of photoelectric elements to a larger area in accordance with a larger amount of movement of said focusing optical system; and wherein a predetermined calculation process is performed to obtain a phase difference from a reference pixel position to a position subtracted from a predetermined maximum data shifting amount, only by a data shifting amount, in a direction depending on a moving direction of the focusing lens group, to obtain a calculation starting pixel position.

* * * * *